United States Patent
Kim et al.

(10) Patent No.: US 10,191,953 B2
(45) Date of Patent: Jan. 29, 2019

(54) METHOD OF STORING AND EXPRESSING WEB PAGE IN AN ELECTRONIC DEVICE

(71) Applicant: Samsung Electronics Co., Ltd., Gyeonggi-do (KR)

(72) Inventors: Kyungtae Kim, Gyeonggi-do (KR); Hyerim Bae, Gyeonggi-do (KR); Changhyup Jwa, Jeju-do (KR); Yangwook Kim, Gyeonggi-do (KR); Sunkee Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 323 days.

(21) Appl. No.: 14/686,059

(22) Filed: Apr. 14, 2015

(65) Prior Publication Data

US 2015/0302076 A1 Oct. 22, 2015

(30) Foreign Application Priority Data

Apr. 17, 2014 (KR) .................. 10-2014-0046017

(51) Int. Cl.
*G06F 17/30* (2006.01)
(52) U.S. Cl.
CPC .... *G06F 17/30563* (2013.01); *G06F 17/3089* (2013.01)
(58) Field of Classification Search
CPC ........... G06F 17/30598; G06F 17/3089; G06F 17/30864; G06F 17/30563; G06F 17/30613
See application file for complete search history.

(56) References Cited

U.S. PATENT DOCUMENTS

| | | | | |
|---|---|---|---|---|
| 7,685,265 B1* | 3/2010 | Nguyen | .................. | G06F 9/542 709/206 |
| 8,682,881 B1* | 3/2014 | Xu | ..................... | G06F 17/30867 707/706 |
| 8,799,274 B2* | 8/2014 | Stephens | ........... | G06F 17/30873 707/722 |
| 9,037,567 B2* | 5/2015 | Wissner | ............ | G06F 17/30705 707/712 |
| 2003/0233617 A1* | 12/2003 | Hirai | ................... | G06F 17/3089 715/234 |
| 2006/0112079 A1 | 5/2006 | Holt et al. | | |
| 2007/0067267 A1* | 3/2007 | Ives | ........................ | G06Q 30/02 |
| 2007/0198741 A1* | 8/2007 | Duffy | .................. | G06F 17/3089 709/245 |

(Continued)

FOREIGN PATENT DOCUMENTS

JP 2005-86542 A 3/2005
WO 20071099544 A2 9/2007

*Primary Examiner* — Leslie Wong
(74) *Attorney, Agent, or Firm* — Cha & Reiter LLC.

(57) ABSTRACT

An electronic device and method are disclosed herein. The electronic device includes a display, and a processor. The processor is configured to control operations of extracting data from at least one web page based on an identified parameter, sorting the extracted data into a particular category of a plurality of categories, generating a page populated by at least some of the extracted data, the page further including functions generated according to content of the extracted data, the functions executable on the content, and displaying a group of pages on the display unit including the generated page.

18 Claims, 23 Drawing Sheets

(56) References Cited

U.S. PATENT DOCUMENTS

| | | | |
|---|---|---|---|
| 2007/0250468 A1* | 10/2007 | Pieper | G06F 17/30867 |
| 2008/0240009 A1* | 10/2008 | Min | H04W 52/343 |
| | | | 370/311 |
| 2010/0268702 A1* | 10/2010 | Wissner | G06F 17/30705 |
| | | | 707/711 |
| 2011/0113352 A1* | 5/2011 | Cundill | G06F 17/30905 |
| | | | 715/760 |
| 2012/0110008 A1* | 5/2012 | Pieper | G06F 17/3089 |
| | | | 707/769 |
| 2012/0278704 A1 | 11/2012 | Ying et al. | |
| 2013/0073400 A1* | 3/2013 | Heath | G06Q 30/02 |
| | | | 705/14.73 |
| 2013/0111317 A1* | 5/2013 | Oliver | G06F 17/30884 |
| | | | 715/205 |
| 2013/0132366 A1* | 5/2013 | Pieper | G06F 17/30867 |
| | | | 707/710 |
| 2014/0188927 A1* | 7/2014 | Moxley | G06F 17/30867 |
| | | | 707/769 |
| 2014/0304774 A1* | 10/2014 | Bejerasco | H04L 63/10 |
| | | | 726/3 |
| 2014/0317075 A1* | 10/2014 | Deutsch | G06F 17/30176 |
| | | | 707/706 |
| 2015/0206099 A1* | 7/2015 | Bockx | G06F 17/30011 |
| | | | 705/343 |
| 2015/0221023 A1* | 8/2015 | Numazu | G06Q 30/08 |
| | | | 705/26.3 |
| 2015/0230078 A1* | 8/2015 | Kandangath | H04L 67/1095 |
| | | | 707/647 |
| 2016/0026226 A1* | 1/2016 | Deutsch | G06F 1/26 |
| | | | 713/300 |

\* cited by examiner

FIG. 6A
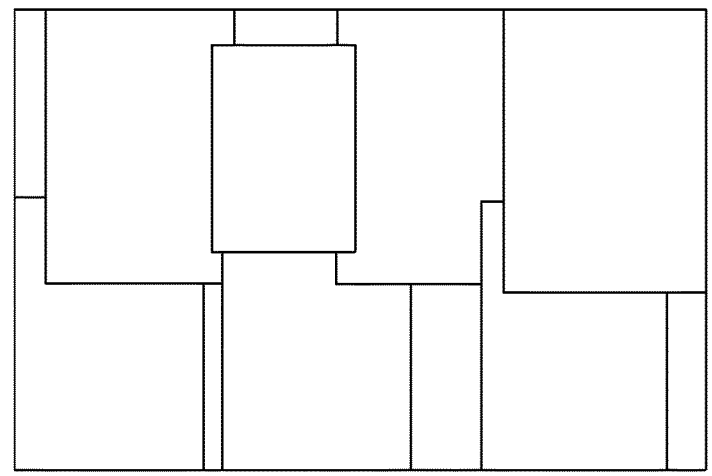
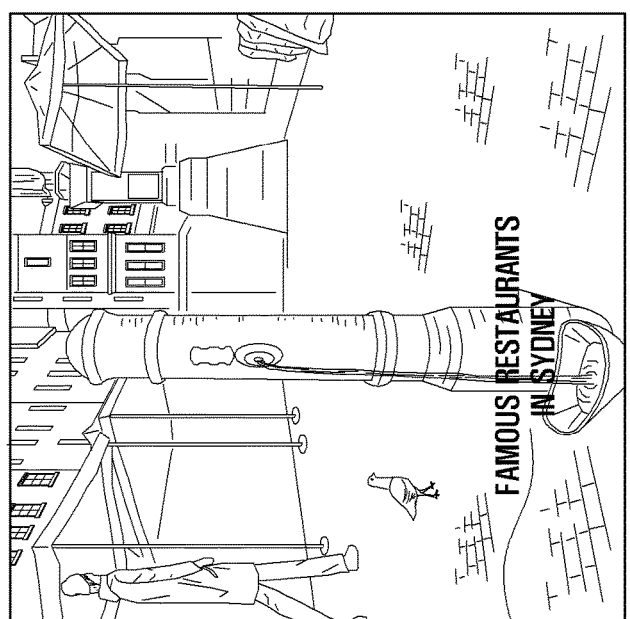

FIG. 6B
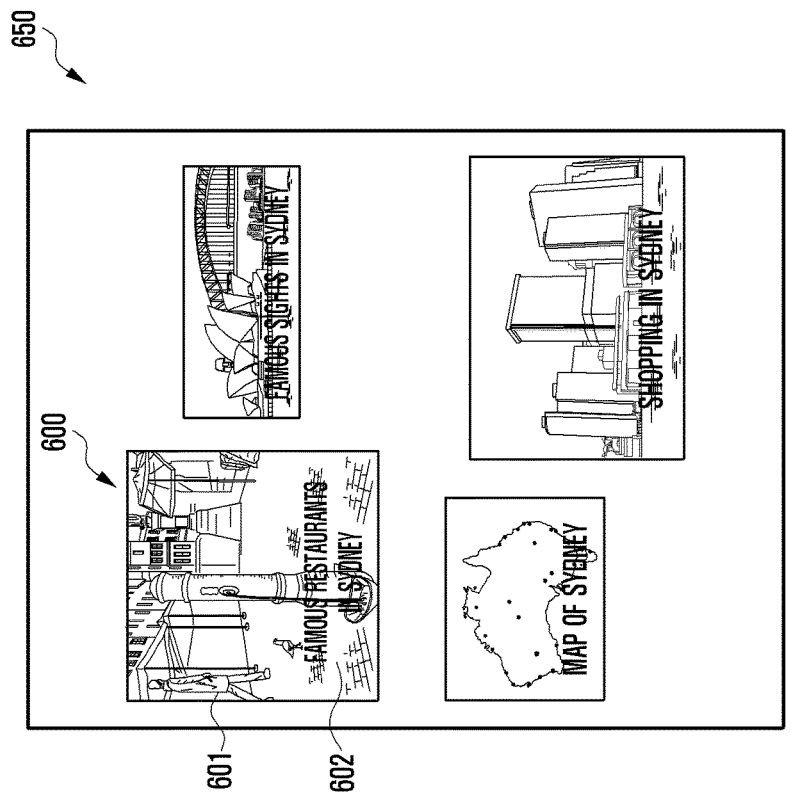
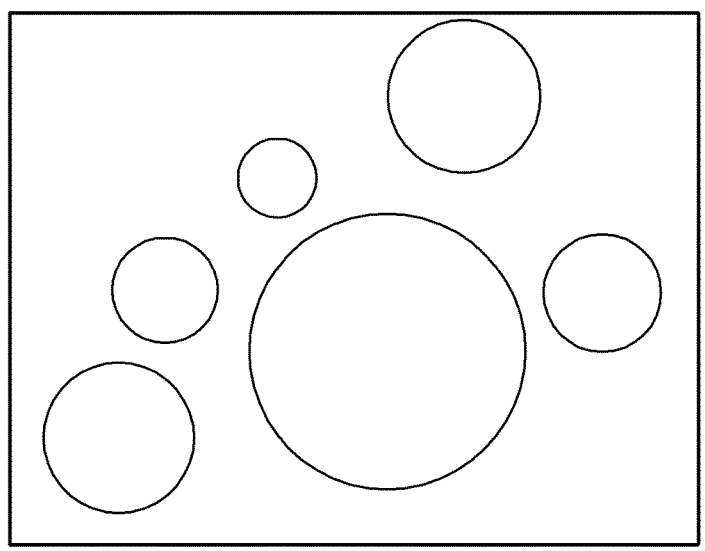

FIG. 7A
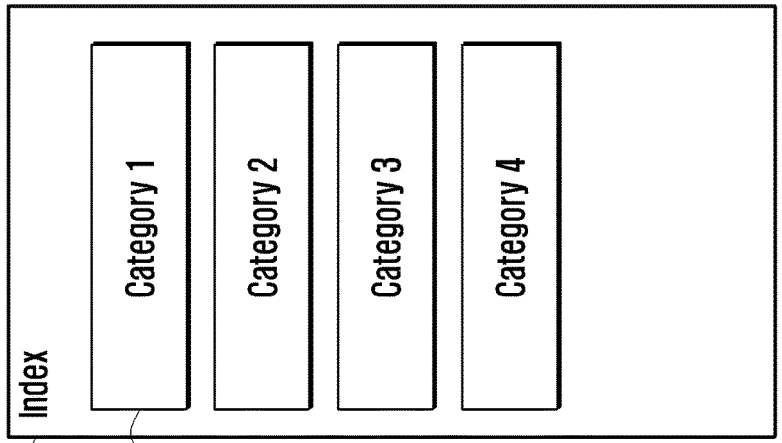
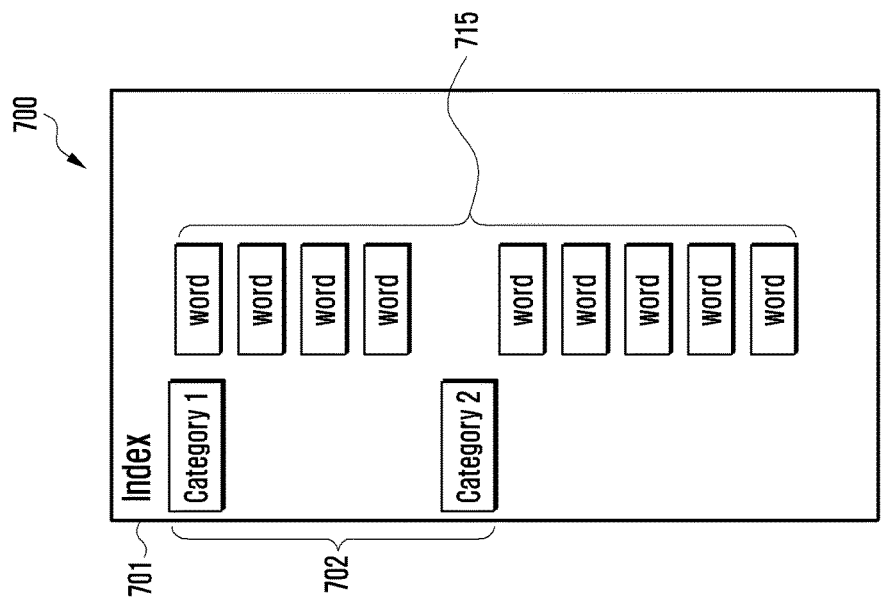

(C)

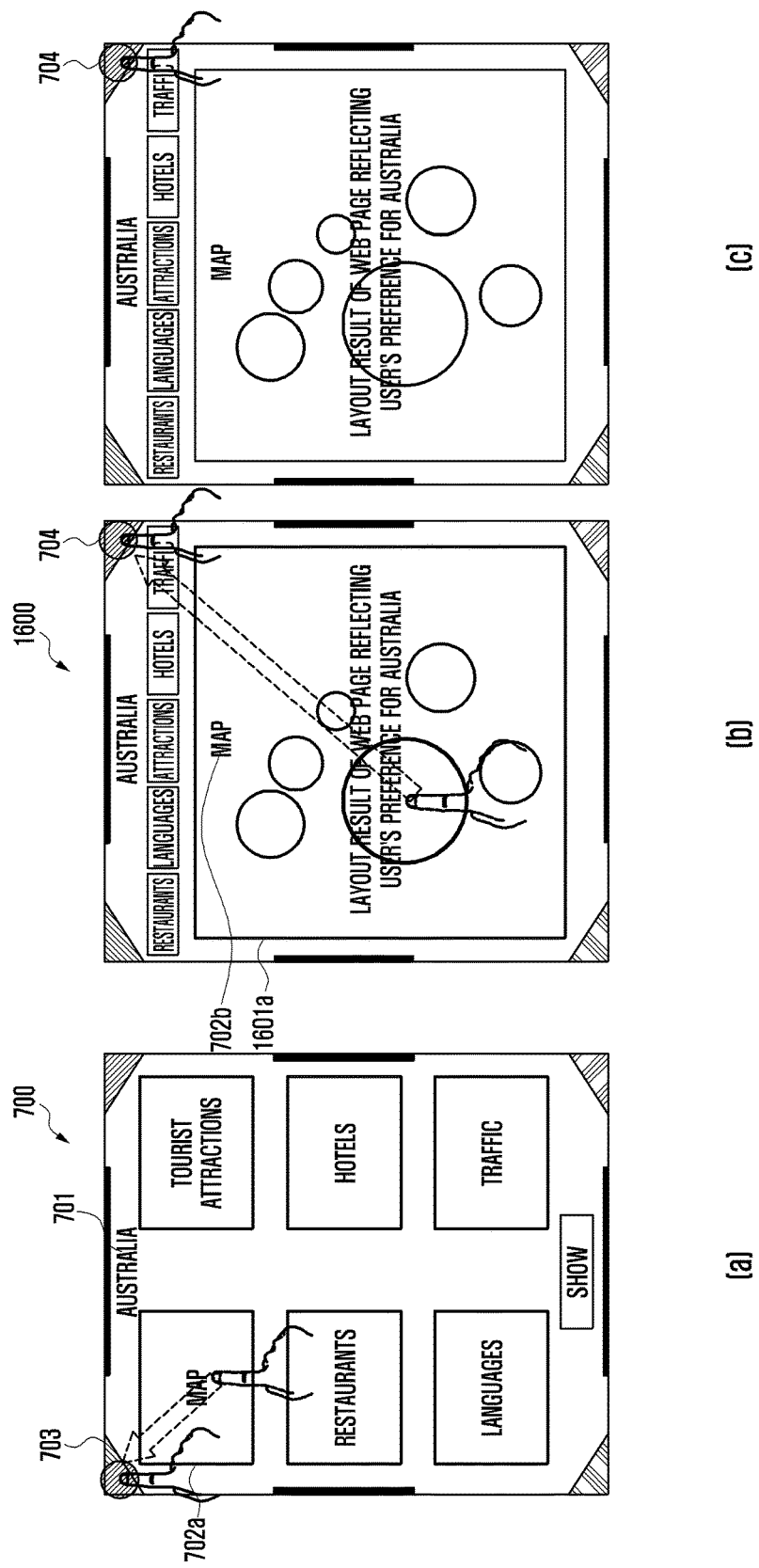

(d)

METHOD OF STORING AND EXPRESSING WEB PAGE IN AN ELECTRONIC DEVICE

CROSS-REFERENCE TO RELATED APPLICATION

This application claims priority from and the benefit under 35 U.S.C. § 119(a) of Korean Patent Application No. 10-2014-0046017, filed on Apr. 17, 2014, which is hereby incorporated by reference for all purposes as if fully set forth herein.

TECHNICAL FIELD

Various embodiments of the present disclosure relate to a method of storing and expressing a web page in an electronic device.

BACKGROUND

With remarkable development of information and communication technologies and semiconductor technologies, electronic devices are being increasingly and widely used. The electronic devices provide a variety of functions including a phone call function, a music reproduction function, a text message transmission/reception function, a digital broadcast reception function, a short-range wireless communication function, an Internet access function, and the like.

The electronic devices involve a web browser to provide an Internet access function.

SUMMARY

Web browsers may access a massive amount of information including information useful to users. However, the users may not remember a particular web page that had previously provided useful information. In this case, it is difficult for the users to revisit the particular web page.

Various embodiments of the present disclosure provide a method and device for conveniently storing and expressing a plurality of web pages.

In one aspect of this disclosure, a method in an electronic device, including extracting data from at least one web page based on an identified parameter, sorting the extracted data into a particular category of a plurality of categories, generating a page populated by at least some of the extracted data, the page further including functions generated according to content of the extracted data, the functions executable on the content, and displaying a group of pages including the generated page.

In another aspect of this disclosure, an electronic device is disclosed, including a display unit, and a processor configured to control operations of extracting data from at least one web page based on an identified parameter, sorting the extracted data into a particular category of a plurality of categories, generating a page populated by at least some of the extracted data, the page further including functions generated according to content of the extracted data, the functions executable on the content, and displaying a group of pages on the display unit including the generated page.

Various embodiments of the present disclosure provide a method and electronic device which may conveniently store a plurality of web pages and efficiently use the web pages to generate content.

BRIEF DESCRIPTION OF THE DRAWINGS

The present disclosure will be more apparent from the following detailed description in conjunction with the accompanying drawings, in which:

FIG. 6A and FIG. 6B illustrate elements including an index page according to various embodiments of the present disclosure;

FIG. 7A and FIG. 7B illustrate index pages according to various embodiments of the present disclosure;

FIG. 17A and FIG. 17B illustrate an index page according to various embodiments of the present disclosure;

DETAILED DESCRIPTION

Figure 1:
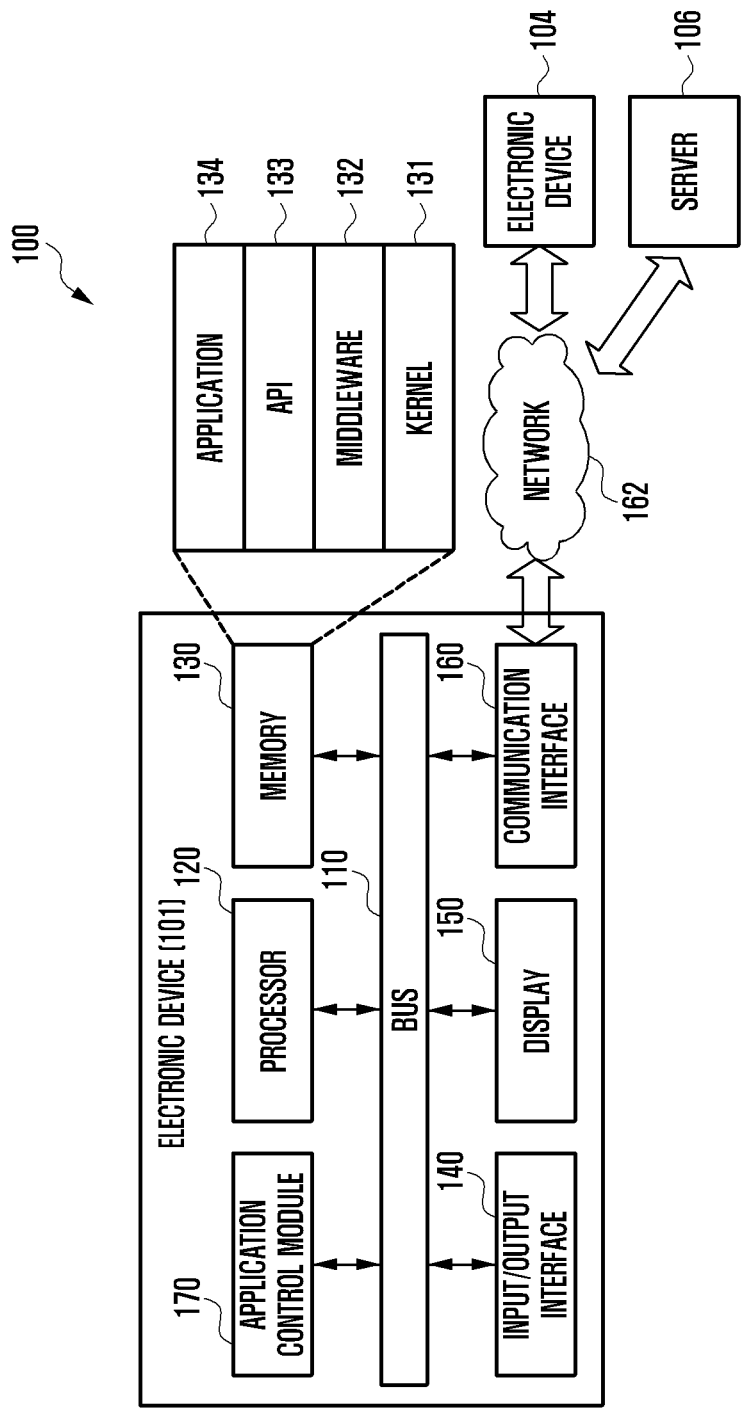
FIG. 1 is a block diagram illustrating a network environment including an electronic device according to various embodiments of the present disclosure.

Example embodiments of the present disclosure are described with reference to the accompanying drawings in detail. Various changes may be made to the disclosure, and the disclosure may have various forms, such that example embodiments will be illustrated in the drawings and described in detail. However, such an embodiment is not intended to limit the disclosure to the disclosed example embodiment and it should be understood that the embodiment include all changes, equivalents, and substitutes of the disclosure. Throughout the drawings, like reference numerals refer to like components.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Examples of the electronic device may include smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g. head-mounted device (HMD) such as electronic glasses, electronic clothing, electronic bracelet, electronic necklace, electronic appcessory, electronic tattoo, smartwatch, etc.

According to an embodiment, the electronic device may be one of smart home appliances having operation support function. Examples of the smart electronic appliance as an electronic device may include television, Digital Video Disk (DVD) player, audio player, refrigerator, air-conditioner, vacuum cleaner, electronic oven, microwave oven, laundry machine, air cleaner, set-to box, TV box (e.g. Samsung HomeSync™, apple TV™, and google TV™), game console, electronic dictionary, electronic key, camcorder, and electronic frame, etc.

According to an embodiment, examples of the electronic device may include medical device (e.g. Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g. maritime navigation device and gyro compass), aviation electronic device (avionics), security device, vehicle head unit, industrial or home robot, Automatic Teller's Machine (ATM) of financial institution, Point Of Sales (POS), etc.

According to an embodiment, examples of the electronic device may include furniture and building/structure having a communication function, electronic board, electronic signature receiving device, projector, and metering device (e.g. water, electric, gas, and electric wave metering devices). According to various embodiments, the electronic device may be any combination of the aforementioned devices. According to various embodiments of the present disclosure, the electronic device may be a flexible device. It is obvious to those skilled in the art that the electronic device is not limited to the aforementioned devices.

FIG. 1 is a diagram illustrating a network environment including electronic devices. Referring to FIG. 1, the electronic device 101 may include a bus 110, a processor 120, a memory 130, an input/output interface 140, a display 150, a communication interface 160, and an application control module 170.

The bus 110 connects the aforementioned components to each other and may be a circuit of exchanging signals (e.g. control messages) among the components.

For example, the processor 120 receives a command from any of the aforementioned components (e.g. memory 130, input/output interface 140, display 150, communication interface 160, and application control module 170) through the bus 110, interprets the command, and executes operation or data processing according to the decrypted command.

The memory 130 may store the command or data received from the processor 120 or other components (e.g. input/output interface 140, display 150, communication interface 160, application control module 170, etc.) or generated by the processor 120 or other components. The memory 130 may store program modules including kernel 131, middleware 132, Application Programming Interface (API) 133, applications 134, etc. Each programming module may be implemented as software, firmware, hardware, and any combination thereof.

The kernel 131 may control or manage the system resources (e.g. bus 110, processor 120, and memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communicated between the API 133 or application 134 and the kernel 131. The middleware 132 may execute control of the task requests from the applications 134 in such a way of assigning priority for use of the system resource (e.g. bus 110, processor 120, and memory 130) of the electronic device to at least one of the applications 134.

The API 133 is the interface for the applications 134 to control the function provided by the kernel 131 or the middleware 132 and may include at least one interface or function (e.g. command) for file control, window control, image control, or text control.

According to various embodiments, the applications 134 may include Short Messaging Service/Multimedia Messaging Service (SMS/MMS) application, email application, calendar application, alarm application, health care application (e.g. application of measuring quantity of motion or blood sugar level), and environmental information application (e.g. atmospheric pressure, humidity, and temperature applications). Additionally or alternatively, the application 134 may be an application related to information exchange between the electronic device 101 and other external electronic device (e.g. electronic device 104). Examples of the information exchange application may include a notification relay application for relaying specific information to the external electronic device and a device management application for managing the external electronic device.

For example, the notification relay application may be provided with a function of relaying the alarm information generated by the other applications (e.g. SMS/MMS application, email application, health care application, and environmental information application) of the electronic device 101 to an external electronic device (e.g. electronic device 104). Additionally or alternatively, the notification relay application may provide the user with the notification information received from an external electronic device (e.g. electronic device 104). The electronic device application may manage (e.g. install, delete, and update) the function of an external electronic device (e.g. turn-on/off of the electronic device 104 itself (or a part of it) or adjustment of the brightness (or resolution) of the display) which communicates with the electronic device 101 or the service (e.g. communication or messaging service) provided by the external electronic device or an application running on the external device.

According to various embodiments, the applications 134 may include an application designated according to the property (e.g. type) of an external electronic device (electronic device 104). If the external electronic device is the MP3 player, the applications 134 may include a music playback application. Similarly, if the external electronic device is a mobile medical appliance, the applications 134 may include a heal care application. According to an embodiment, the application 134 may include at least one of applications designated to the electronic device 101 or the applications received from the external electronic device (e.g. server 106 and electronic device 104).

The input/output interface 140 delivers the command or data input by the user through with an input/output device (e.g. sensor, keyboard, and touchscreen) to the processor 120, memory 130, communication interface 160, and/or application control module 170 through the bus 110. For example, the input/output interface 140 may provide the processor 120 with the data corresponding to the touch may by the user on the touchscreen. The input/output interface 140 may output the command or data (which is received from the processor 120, memory 130, communication interfaced 160, or the application control module 170 through the bus 110) through the input/output device (e.g. speaker and display). For example, the input/out interface 140 may output the voice data processed by the processor 120 to the user through the speaker.

The display 150 may present various information (e.g. multimedia data and text data) to the user.

The communication interface 160 may establish a communication connection of the electronic device 101 with an external device (e.g. electronic device 104 and server 106). For example, the communication interface 160 connects to the network 162 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g. Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment, the network 162 may be a telecommunication network. The communication network may include at least one of computer network, Internet, Internet of Things, or telephone network. According to an embodiment, the communication protocol between the electronic device 101 and an external device (e.g. transport layer protocol, data link layer protocol, and physical layer protocol) may be supported by at least one of the applications 134, API 133, middleware 132, kernel 131, or communication interface 160.

According to an embodiment, the server 106 may execute at least one of operations (or functions) implemented at the electronic device 101 to support the operation of the electronic device 101. For example, the server 106 may include an item recommend server module capable of supporting the application control module 170 embodied in the electronic device 101. For example, the item recommend server module includes a part of the application control module 170 at least to perform (e.g. in the stead of the operation module) at least one of the operations in charge of the application control module 170.

Figure 2:
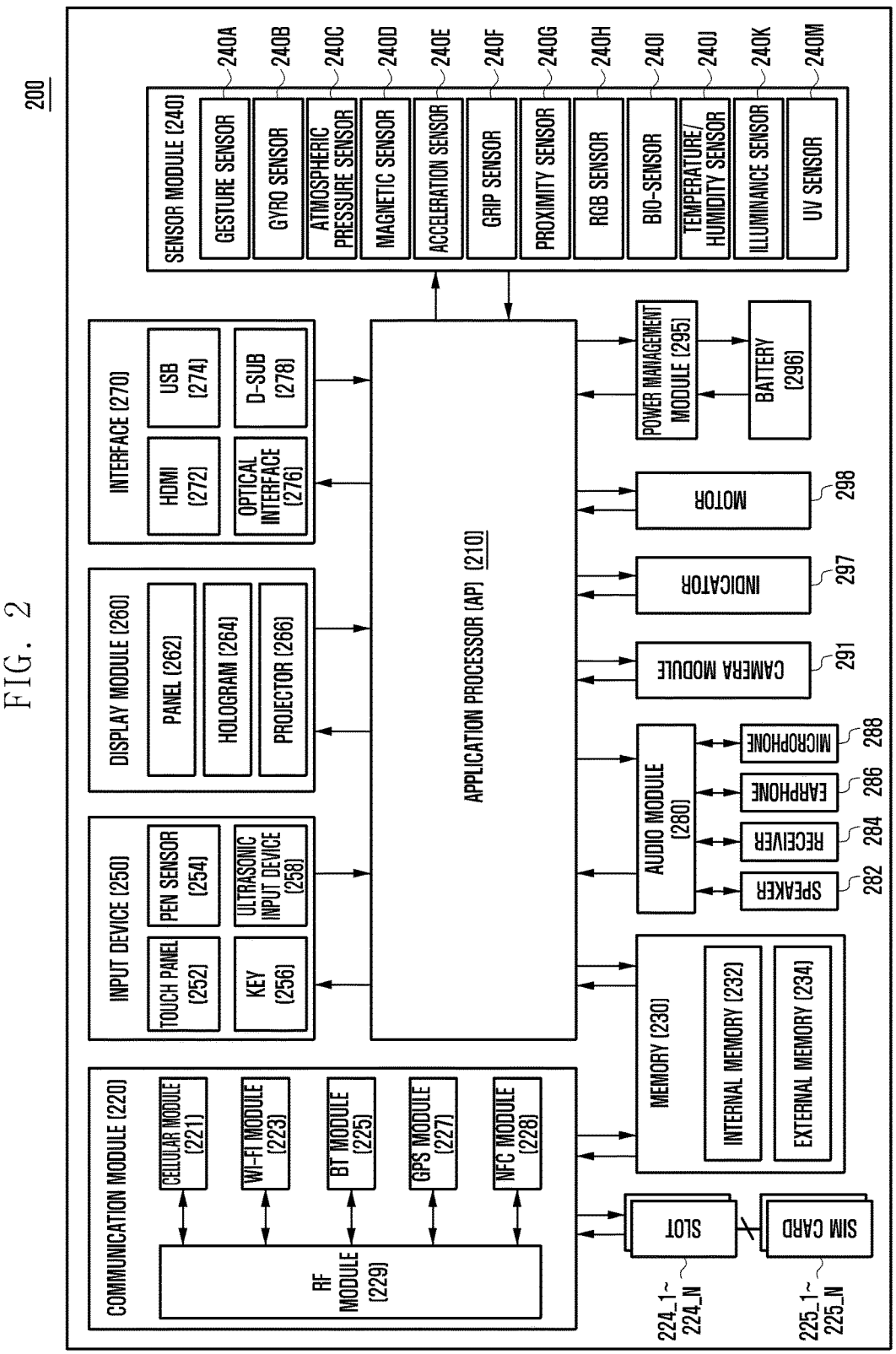
FIG. 2 is a block diagram of an electronic device according to various embodiments of the present disclosure.

FIG. 2 is a block diagram illustrating a configuration of the electronic device according to various embodiments of the present disclosure. The electronic device 1301 may be of the whole or a part of the electronic device 101. Referring to FIG. 7, the electronic device 201 may include an Application Processor (AP) 210, a communication module 220, a Subscriber Identity Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may operate an Operating System (OS) and/or application programs to control a plurality of hardware and/or software components connected to the AP 210 and perform data-processing and operations on multimedia data. For example, the AP 210 may be implemented in the form of System on Chip (SoC). According to an embodiment, the AP 210 may include a Graphic Processing Unit (GPU) (not shown).

The communication module 220 (e.g. communication interface 160) may perform data communication with other electronic devices (e.g. electronic device 104 and server 106) through a network. According to an embodiment, the communication module 220 may include a cellular module 221, a Wi-Fi module 223, a BT module 225, a GPS module 227, an NFC module 228, and a Radio Frequency (RF) module 229.

The cellular module 221 is responsible for voice and video communication, text messaging, and Internet access services through a communication network (e.g. LTE, LTE-A, CDMA, WCDMA, UMTS, WiBro, and GSM networks). The cellular module 221 may perform identification and authentication of electronic devices in the communication network using the SIM card 224. According to an embodiment, the cellular module 221 may perform at least one of the functions of the AP 210. For example, the cellular module 221 may perform at least a part of the multimedia control function.

According to an embodiment, the cellular module 221 may include a Communication Processor (CP). The cellular module 221 may be implemented in the form of SOC. Although the cellular module 221 (e.g. communication processor), the memory 230, and the power management module 295 are depicted as independent components separated from the AP 210, the present disclosure is not limited thereto but may be embodied in a way that the AP includes at least one of the components (e.g. cellular module 221).

According to an embodiment, each of the AP 210 and the cellular module 221 (e.g. communication processor) may load a command or data received from at least one of the components on a non-volatile or volatile memory and process the command or data. The AP 210 or the cellular module 221 may store the data received from other components or generated by at least one of other components in the non-volatile memory.

Each of the Wi-Fi module 223, the BT module 225, the GPS module 227, and the NFC module 228 may include a processor for processing the data it transmits/receives. Although the cellular module 221, the Wi-Fi module 223, the BT module 225, the GPS module 227, and the NFC module 228 are depicted as independent blocks; at least two of them (e.g. communication processor corresponding to the cellular module 221 and Wi-Fi processor corresponding to the Wi-Fi module 223) may be integrated in the form of SoC.

The RF module 229 is responsible for data communication, e.g. transmitting/receiving RF signals. Although not depicted, the RF module 229 may include a transceiver, a Power Amp Module (PAM), a frequency filter, and a Low Noise Amplifier (LNA). The RF module 229 also may include the elements for transmitting/receiving electric wave in free space, e.g. conductor or conductive wire. Although FIG. 2 is directed to the case where the Wi-Fi module 223, the BT module 225, the GPS module 227, and the NFC module 228 are sharing the RF module 229, the present disclosure is not limited thereto but may be embodied in a way that at least one of the Wi-Fi module 223, the BT module 225, the GPS module 227, or the NFC module 228 transmits/receives RF signals an independent RF module.

The SIM card 224 may be designed so as to be inserted into a slot formed at a predetermined position of the electronic device. The SIM card 224 may store unique identity information (e.g. Integrated Circuit Card Identifier (ICCID)) or subscriber information (e.g. International Mobile Subscriber Identity (IMSI)).

The memory 230 (e.g. memory 130) may include at least one of the internal memory 232 or an external memory 234. The internal memory 232 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, or NOR flash memory)

According to an embodiment, the internal memory 232 may be a Solid State Drive (SSD). The external memory 234 may be a flash drive such as Compact Flash (CF), Secure Digital (SD), micro-SD, Mini-SD, extreme Digital (xD), and Memory Stick. The external memory 234 may be connected to the electronic device 201 through various interfaces functionally. According to an embodiment, the electronic device 201 may include a storage device (or storage medium) such as hard drive.

The sensor module 240 may measure physical quantity or check the operation status of the electronic device 201 and convert the measured or checked information to an electric signal. The sensor module 240 may include at least one of gesture sensor 240A, Gyro sensor 240B, barometric sensor 240C, magnetic sensor 240D, acceleration sensor 240E, grip sensor 240F, proximity sensor 240G, color sensor 240H (e.g. Red, Green, Blue (RGB) sensor), bio sensor 240I, temperature/humidity sensor 240J, illuminance sensor 240K, or Ultra Violet (UV) sensor 240M. Additionally or alternatively, the sensor module 240 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 240 may further include a control circuit for controlling at least one of the sensors included therein.

The input device 250 may include a touch panel 252, a (digital) pen sensor 254, keys 256, and an ultrasonic input device 258. The touch panel 252 may be one of capacitive, resistive, infrared, microwave type touch panel. The touch panel 252 may include a control circuit. In the case of the capacitive type touch panel, it is possible to detect physical contact or approximation. The touch panel 252 may further include a tactile layer. In this case, the touch panel 252 may provide the user with haptic reaction.

The (digital) pen sensor 254 may be implemented with a sheet with the same or similar way as touch input of the user or a separate recognition sheet. The keys 256 may include physical buttons, optical key, and keypad. The ultrasonic input device 258 is a device capable of checking data by detecting sound wave through a microphone 288 and may be implemented for wireless recognition. According to an embodiment, the electronic device 201 may receive the user input made by means of an external device (e.g. computer or server) connected through the communication module 220.

The display 260 (e.g. display module 150) may include a panel 262, a hologram device 264, and a projector 266. The panel 262 may be a Liquid Crystal Display (LCD) panel or an Active Matrix Organic Light Emitting Diodes (AMOLED) panel. The panel 262 may be implemented so as to be flexible, transparent, and/or wearable. The panel 262 may be implemented as a module integrated with the touch panel 252. The hologram device 264 may present 3-dimentional image in the air using interference of light. The projector 266 may project an image to a screen. The screen may be placed inside or outside the electronic device. According to an embodiment, the display 260 may include a control circuit for controlling the panel 262, the hologram device 264, and the projector 266.

The interface 270 may include a High-Definition Multimedia Interface (HDMI) 272, a Universal Serial Bus (USB) 274, an optical interface 276, and a D0subminiature (D-sub) 278. The interface 270 may include the communication interface 160 as shown in FIG. 1. Additionally or alternatively, the interface 270 may include a Mobile High-definition Link (MHL) interface, a SD/MMC card interface, and infrared Data Association (irDA) standard interface.

The audio module 280 may convert sound to electric signal and vice versa. At least a part of the audio module 280 may be included in the input/output interface 140 as shown in FIG. 1. The audio module 280 may process the audio information input or output through the speaker 282, the receiver 284, the earphone 286, and the microphone 288.

The camera module 291 is a device capable of taking still and motion pictures and, according to an embodiment, includes at least one image sensor (e.g. front and rear sensors), a lens (not shown), and Image Signal Processor (ISP) (not shown), and a flash (e.g. LED or xenon lamp) (not shown).

The power management module 295 may manage the power of the electronic device 201. Although not shown, the power management module 295 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger or wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 296, charging voltage, current, and temperature. The battery 296 may store or generate power and supply the stored or generated power to the electronic device 201. The battery 296 may include a rechargeable battery or a solar battery.

The indicator 297 may display operation status of the electronic device 201 or a part of the electronic device, booting status, messaging status, and charging status. The motor 298 may converts the electronic signal to mechanical vibration. Although not shown, the electronic device 201 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

As described above, the electronic device operating method and apparatus of the present disclosure is capable of providing diverse screen displays in adaptation to various conditions to implement optimal environment for utilizing the electronic device, resulting in improvement of user convenience. Also, the electronic device operating method and apparatus of the present disclosure facilitates navigation between folders by sorting the folders by hierarchical level.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

Figure 3:
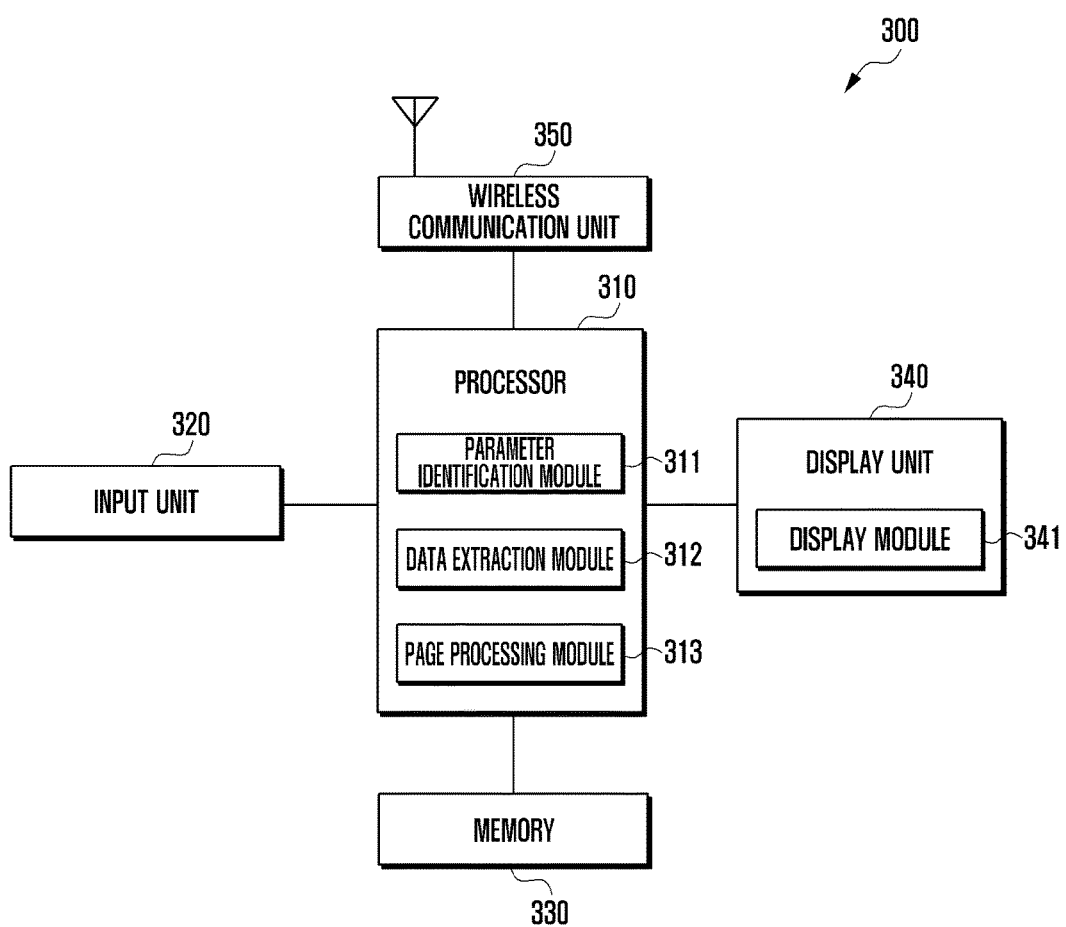
FIG. 3 is a block diagram of an electronic device according to various embodiments of the present disclosure.

FIG. 3 is a block diagram of an electronic device according to various embodiments of the present disclosure.

Referring to FIG. 3, an electronic device 300 may include a processor 310, an input unit 320, a memory 330, a display unit 340, and a wireless communication unit 350.

The processor 310 corresponds to the processor 120 of FIG. 1 and the application processor 210 of FIG. 2. The processor 310 may include a parameter identification module 311, a data extraction module 312, and a page processing module 313. Here, a parameter conforms to a user's settings, and the processor 310 may set the parameter through the user's selection on the basis of the user's profile.

The parameter may include, for example, the user's morning call time, favorite news category, and schedule. The parameter identification module 311 may periodically search web pages based on the parameter. In addition, the parameter identification module 311 may search web pages based on the parameter even while the user uses a web browser. The parameter identification module 311 may determine web pages to be stored and a time point and a target in the web pages to be stored either through the user's inputs (e.g., motion or gesture control), or through a periodic parameter check.

The data extraction module 312 may extract the target determined or identified by the parameter identification module 311. The data extraction module 312 may store the extracted pages and sub-resources (e.g., css, javascript, and images) including the web pages in the memory 330. The data extraction module 312 may store the web pages as they are or may store the web pages through processing them into a particular form according to the user's inputs, selections or setting. For example, the data extraction module 312 may store the central portion alone, or the upper and lower portions of the data of the web pages, which may be stored on the basis of a particular template. In addition, the data extraction module 312 may store a word of a larger font size at the central portion of the web pages so as to store the representative text. The data extraction module 312 may extract and store only an image of a predetermined size or greater so as to store only the representative image.

The page processing module 313 may analyze the stored web pages to extract data indicated as necessary, useful or desirable (e.g., "necessary" data). In order to extract the necessary data from the web pages, the page processing module 313 may use processes for extracting a list (e.g., such as an index in a book), extracting keywords, and extracting an abbreviated format. The page processing module 313 may carry out these methods using the certain processes, some of which may be described here. In an "extraction-based summarization" scheme, all words in the web page are extracted, and then the number of extracted words is weighted and scored based on the beginning and end of text in the web page (e.g., introduction, and conclusion, which typically includes a brief summary somewhere in the structure of text), thereby extracting certain necessary data. In the "maximum entropy" based summarization scheme (which may extend from the aforementioned scheme), keywords utilized in the web page are classified into different categories after being extracted via diverse algorithms based on several web pages as in the extraction-based summarization scheme, and the web pages are stored according to the categories which may be rearranged, or the stored web pages may be distinguished by creating new categories.

The page processing module 313 may process the extracted data to show the data in a form desired by the user. The page processing module 313 may process the stored data through the following method. The stored data may be sorted according to a subject, a date, a particular subject, and importance thereof. In addition, the page processing module 313 may also highlight the sorted data. The data may be highlighted by adjusting a font size or arrangement thereof. The page processing module 313 may structuralize the data processed as described above. The page processing module 313 may be a site map type. The site map refers to a visual content model for searching for data of a website at a glance. The site map may be a hierarchical type gradually descending towards main search data, or a 3D model.

The input unit 320 may correspond to the input device 250 of FIG. 2. The memory 330 may correspond to the memory 230 of FIG. 2. The display unit 340 may correspond to the display module 260 of FIG. 2. The wireless communication unit 350 may correspond to the communication module 220 of FIG. 2.

A device for storing and expressing a web page in an electronic device according to various embodiments of the present disclosure may include: a display unit including a display module for displaying a web page and a group page; a memory for storing data extracted from the web page; and a processor for controlling a wireless communication unit that downloads the web page, wherein the processor includes a data extraction module that extracts necessary data from a web page based on a parameter, stores the extracted data, an operation of sorting items based on the stored data, makes a configuration to perform a function designated based on the items and the stored data, creates a page for which the function is configured, and displays a page group including the page.

Figure 4:
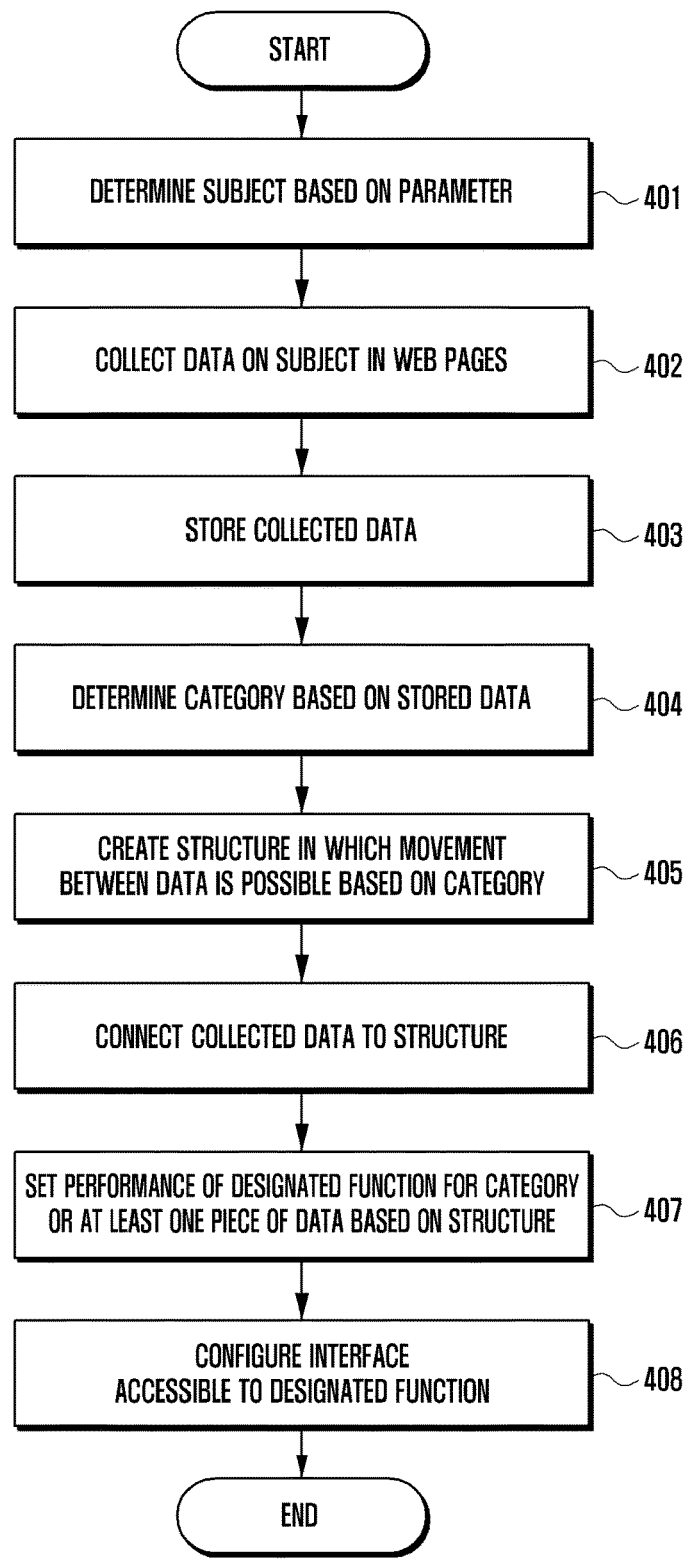
FIG. 4 is a flowchart according to various embodiments of the present disclosure.

FIG. 4 is a flowchart according to various embodiments of the present disclosure.

Referring to FIG. 4, in step 401, the parameter identification module 311 may determine or identify a subject to store based on a parameter, which may include, for example, a parameter received or detected via a user input, as described with reference to FIG. 1. In step 402, the data extraction module 312 may collect data on the subject (e.g., a web page or a component or feature of a web page). In step 403, the data extraction module 312 may collect the data and store the collected data in memory. In this case, the data extraction module 312 may further identify a storage time point and a storage target for the data. The data extraction module 312 may determine the storage time point according to a current time, a network condition, a location, an additional charge condition, and a battery condition. In situations where the data extraction module 312 stores the data differently according to time, the data may be stored at night or at a time point when the data to be stored (e.g., news data) is updated in a web browser. In addition, when a user utilizes data having a hierarchical structure or a connection relationship that is expressible within the web browser (e.g., such as a case where another web page is linked to a web page of a web browser), the data extraction module 312 may pre-store, in advance, the data having the hierarchical structure or the connection relationship (e.g., storing the linked webpage as data having a lower priority or a lower layer/level in a data hierarchy). In describing the aforementioned contents as an example, it is understood that the data having the hierarchical structure may also include data displayed, expressed or stored in a series. If the user uses the first part of a series in a web browser, the data extraction module 312 may pre-store, in advance, the second and the third parts of the series.

When the user searches a dictionary page for a word, data having a connection relationship may include a page, panel or window that displays the discovered word, and a web page that is linked to the page to provide supplementary explanation for the discovered word. In this case, the page which explains the word discovered from the dictionary page and the page which provides the explanation associated with the word may have a connection relationship therebetween.

In cases where the data extraction module 312 differently stores the data according to a network condition, the network condition may be differently stored by identifying the data transmission rate of the network and whether broadband connection is made. In addition, when the electronic device is portable, and moved to an area having a weak network connection due to a poor or degraded data signal (e.g. cellular, wi-fi, etc.), the data may be stored or cached in advance to prevent an inability to access the data as a result of the poor data signal. In cases where the data extraction module 312 differently stores the data according to the location of an electronic device, the data extraction module 312 may store the data for each category of interest according to the user's home or office based on the parameter identified by the parameter identification module 311. Furthermore, in preparation for a case where the user allowing for network access only in a Wi-Fi network deviates from the Wi-Fi network, the data extraction module 312 may store in advance necessary data identified by the parameter identification module 311 through the parameter.

When the parameter identification module 311 identifies through location data from a GPS that the user is at an airport and discerns through a schedule that the user will take an airplane, the data extraction module 312 may store necessary data before the user gets on the airplane. In cases where the data extraction module 312 differently stores the data according to an additional charge condition, when a network is used, the data extraction module 312 may identify a presence or absence of additional charges through the electronic device or an external device and store the data only when the additional charges are not required. In cases where the data extraction module 312 differently stores the data according to a battery condition, the data extraction module 312 may not store the data when it is determined that a battery residual quantity is less than a predetermined value and may store the data when the battery residual quantity is greater than the predetermined value or when the electronic device is being charged.

The data extraction module 312 may determine whether to store the data according to states, connection relationships, Uniform Resource Locators (URLs), contents, and types of data. In cases where the data extraction module 312 determines whether to store the data according to states of the data, the data extraction module 312 may store the data based on dates when web pages including the data have been generated. The data extraction module 312 may store a search result web page according to the user's search keyword. The data extraction module 312 may store the entire web page or may designate a region including a plurality of articles in the web page to store a list of the articles in the corresponding region.

The data extraction module 312 may extract and store only data for higher priority targets. In cases where the data extraction module 312 determines whether to store the data according to connection relationships of the data, the data extraction module 312 may identify a residual capacity of the memory to determine the maximum storage capacity, store the entire first page of the web page of the data to be stored, and store a gradually decreasing amount of data towards the following pages. The data extraction module 312 may store link titles and the title of a target to be stored. In addition, the data extraction module 312 may store data lists on a web page such that all or some of them may be recognized and stored according to the user's selection. In cases where the data extraction module 312 determines whether to store the data according to contents of the data, the data extraction module 312 may store the data based on keywords that are selected by the parameter identification module 311 through preference analysis on the basis of the user's profile. For example, data in a series format may all be stored while being grouped into categories for a web page including the same. In this case, if it is difficult to store all the data, the data having been selected by the user may be stored in a particular window form, and the remaining data may be stored by detecting the user's selection. In cases where the data extraction module 312 determines whether to store the data according to types of data, if the data is image data, the data extraction module 312 may store moving images. In this case, if the data is more likely to have problems involving copyright and capacity, the data extraction module 312 may store the data in units of a predetermined time interval by dividing the frames thereof. If the data is voice data, the data extraction module 312 may store a particular portion of the voice data to be stored or may store a sample through which the entire mood of the voice data can be identified.

In step 404, the page processing module 313 may determine a category based on the data stored by the data extraction module 312. In step 405, based on the category, the page processing module 313 may create an index page in a structure in which movement between the data is possible. In step 406, the page processing module 313 may connect data collected in the structure of the index page. In step 407, based on the structure, the page processing module 313 may make a configuration to perform a function for the category or at least one piece of the collected data. In step 408, the page processing module 313 may configure an interface accessible to a designated function.

Figure 5:
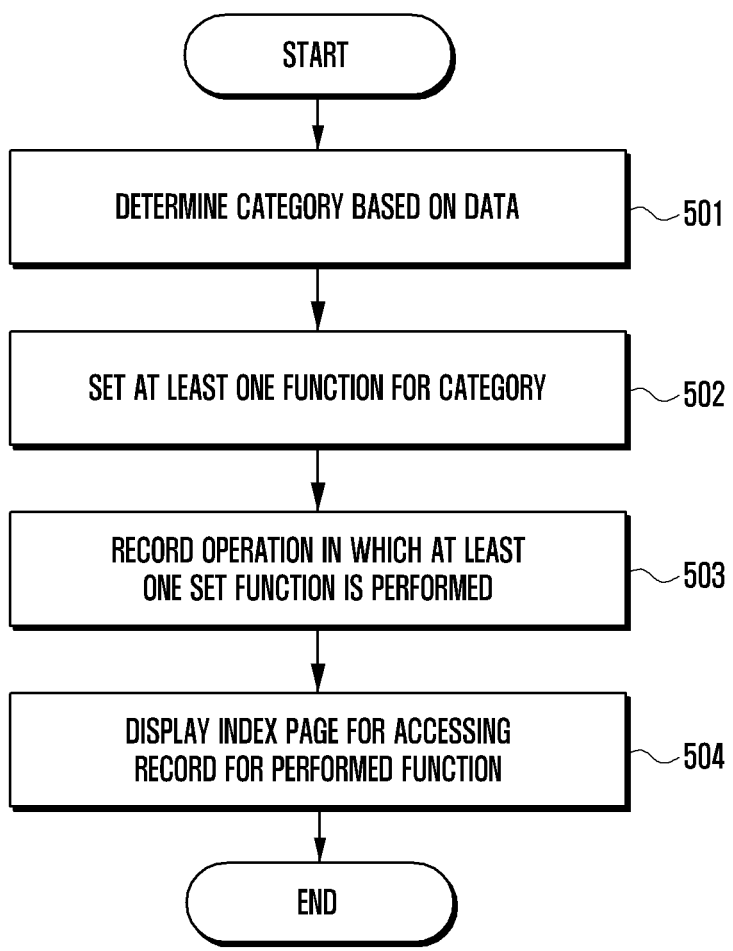
FIG. 5 is a flowchart illustrating a process of creating an index page according to various embodiments of the present disclosure.

FIG. 5 is a flowchart illustrating a process of creating an index page according to various embodiments of the present disclosure.

Referring to FIG. 5, in step 501, the page processing module 313 may determine a category based on data extracted by the data extraction module 312. In step 502, the page processing module 313 may set at least one function for the category. For example, the function may include a function of viewing only web pages having a picture, a function of viewing web pages having a particular word, a function of changing a web page into a particular layout, a function of applying in a particular sequence, a function of viewing web pages in a similar form, and a function of viewing only particular moving images. In step 503, the page processing module 313 may record an operation in which the set function is performed. In step 504, the page processing module 313 may display an index page for accessing the record for the performed function.

FIGS. 6A and 6B illustrate elements including a page according to various embodiments of the present disclosure.

Referring to FIG. 6A, a thumbnail 600 may represent a category including one or more items. The thumbnail 600 refers to a small picture of a page on a screen that is decreased such that a layout of the entire page can be viewed at a glance. The thumbnail may include a representative image 601 that represents the category and a representative text 602. The representative image 601 may be set a user's selection and extracted from images of data including the category. The representative text 602 may be set the user's selection and may be set as text representing sorted data by the page processing module 313.

FIG. 6A (b-1) and FIG. 6B (b-2) represent examples of a template including a page.

FIG. 6B (c) illustrates a page obtained (or generated) by applying the thumbnail 600 to the template illustrated in FIG. 6A (b-1). A page 650 illustrated in FIG. 6B (c) may include the at least one thumbnail 600. The page processing module 313 may include a page by applying the thumbnail 600 to a template, or by receiving a setting the user.

Figure 7B:
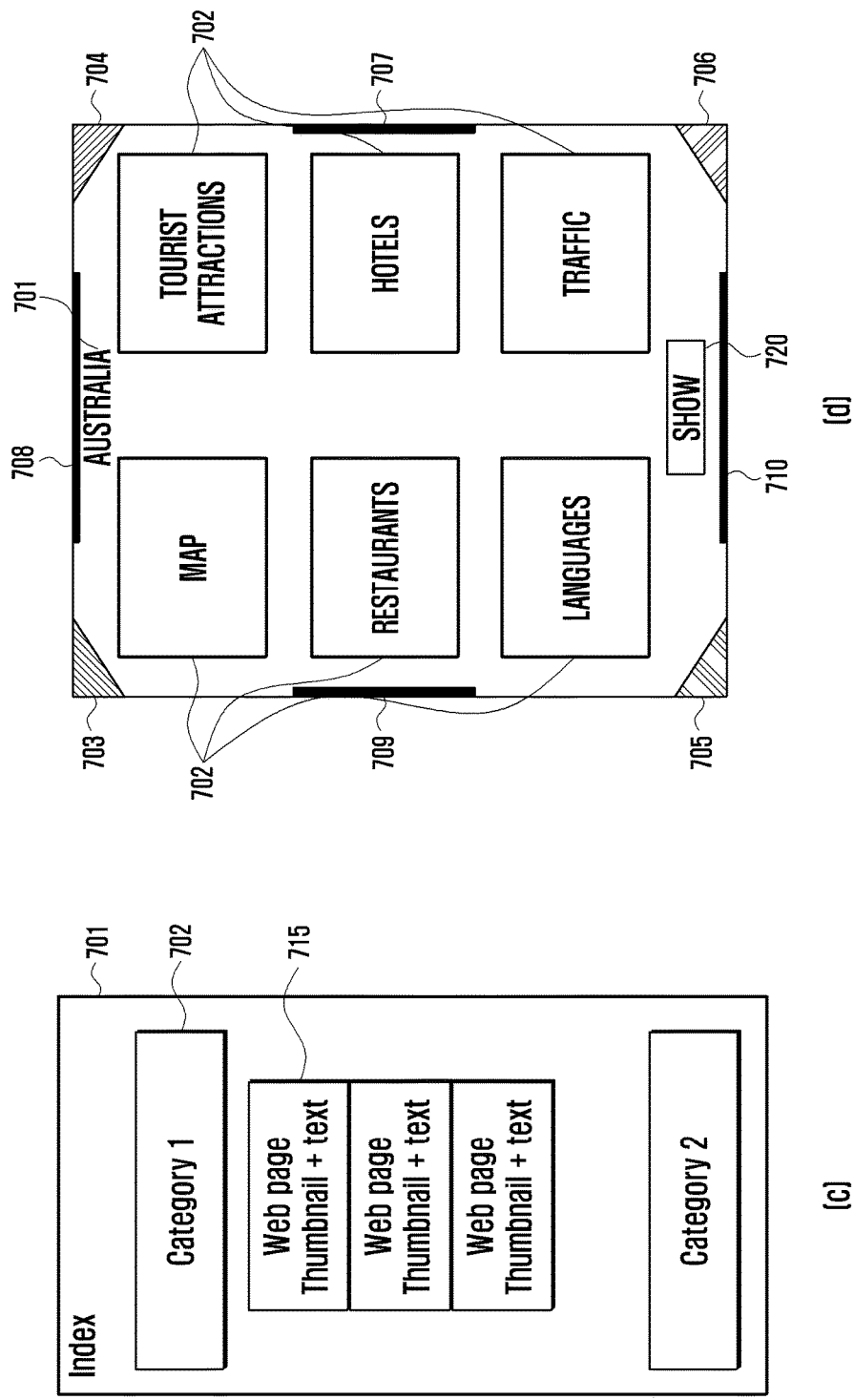

FIGS. 7A and 7B illustrate pages according to various embodiments of the present disclosure.

Referring to FIGS. 7A and 7B, the page processing module 313 may include pages 700 in a variety of forms. For example, FIG. 7A (a) illustrates a page 700 including categories 702 of typical books. FIG. 7A (b) illustrates a page 700 listing categories 702 suitable for an index, such as a particular subject 701. FIG. 7B (c) illustrates a page 700 including display of a category 702, and thumbnails 715 from a web page depending upon (or correlating to) the category 702.

FIG. 7B (d) illustrates a page 700 in which classified categories 702 and marks 703 to 710 (e.g., selectable elements, objects, icons, indicators, etc.) are displayed. The page processing module 313 may display categories 702 as thumbnails (e.g., thumbnail 600 from FIG. 6) and may set at least one particular function for each of the marks at corners 703 to 706 of the page 700, marks at the upper, lower, left, and right sides 707 to 710. The page 700 illustrated in FIG. 7B (d) will be further described below as an example. The parameter identification module 311 may identify parameters to determine a subject 701 and a web page to store. For example, the parameter identification module 311 may determine the subject 701 'Australia' and a web page including data on Australia. The data extraction module 312 may control the wireless communication unit 350 according to the subject 701 'Australia' and store the corresponding data in the determined (or detected) web page, for example 'Famous restaurants in Sydney, Australia' and 'Hotels around Australia Airport', in the memory 330. The page processing module 313 may create or generate the categories 702 on the basis of the stored data, and the categories 702 may thus include, for example, 'Map', 'Tourist attractions', 'Restaurants', 'Hotels', 'Languages', and 'Traffic.' The page processing module 313 may create the page 700 based on the determined categories 702. The page 700 may include text representing or identifying the subject 701 'Australia,' representative of the categories 702, and may further include the eight marks 703 to 710 which may perform particular functions, in addition to the categories 702. The page processing module 313 may generate a "show" button 720, which, when activated, shows at least the selected category 702 and a particular function of at least one of the marks 703 to 710 when a user's selection is detected or recognized. The various types of pages 700 illustrated in FIGS. 7A and 7B may be changed according to the user's selection or gesture (such, as touch gestures including a flip or hovering input).

FIG. 8 through FIG. 17 illustrate various embodiments of the present disclosure in the index page form of FIG. 7B (d).

Figure 8:
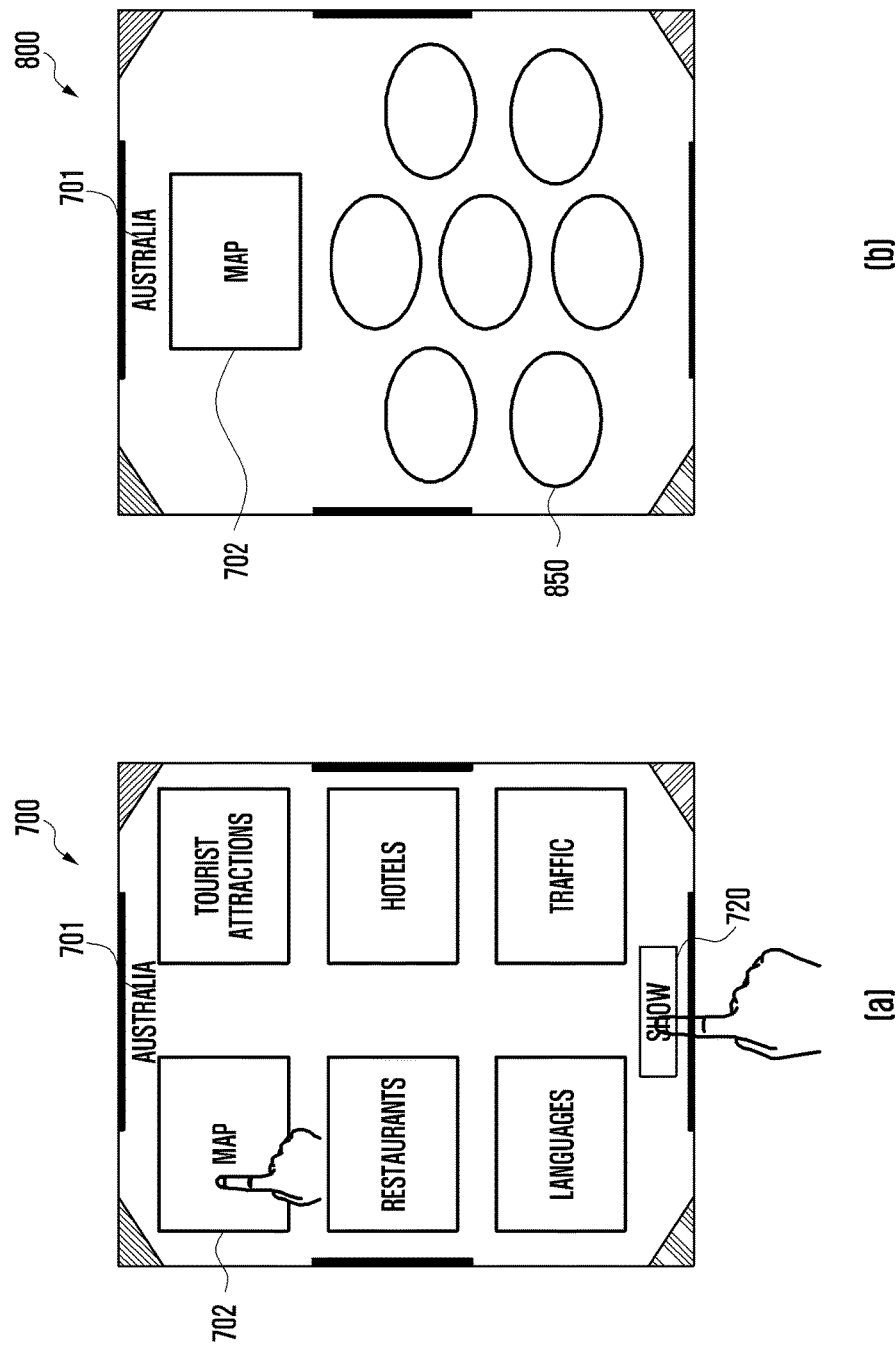
FIG. 8 illustrates an index page according to various embodiments of the present disclosure.

FIG. 8 illustrates an index page according to various embodiments of the present disclosure.

Referring to FIG. 8 (*a*), the processor 310 may recognize or detect a user's selection of a category 702 (e.g., "Map") and the "show" button 704. Referring to FIG. 8 (*b*), the page processing module 313 may control the display module 341 to display data stored for the selected category 702. The page processing module 313 may display the selected category 702 with at least one of a thumbnail, representative text, or a representative image and may display data 850, which is extracted and stored for the category 702, together with the category 702. The page processing module 313 may display a designated template, or the data 850 stored according to the user's selection. In addition, the page processing module 313 may change a structure for displaying the data 850 stored by the user's selection.

Figure 9:
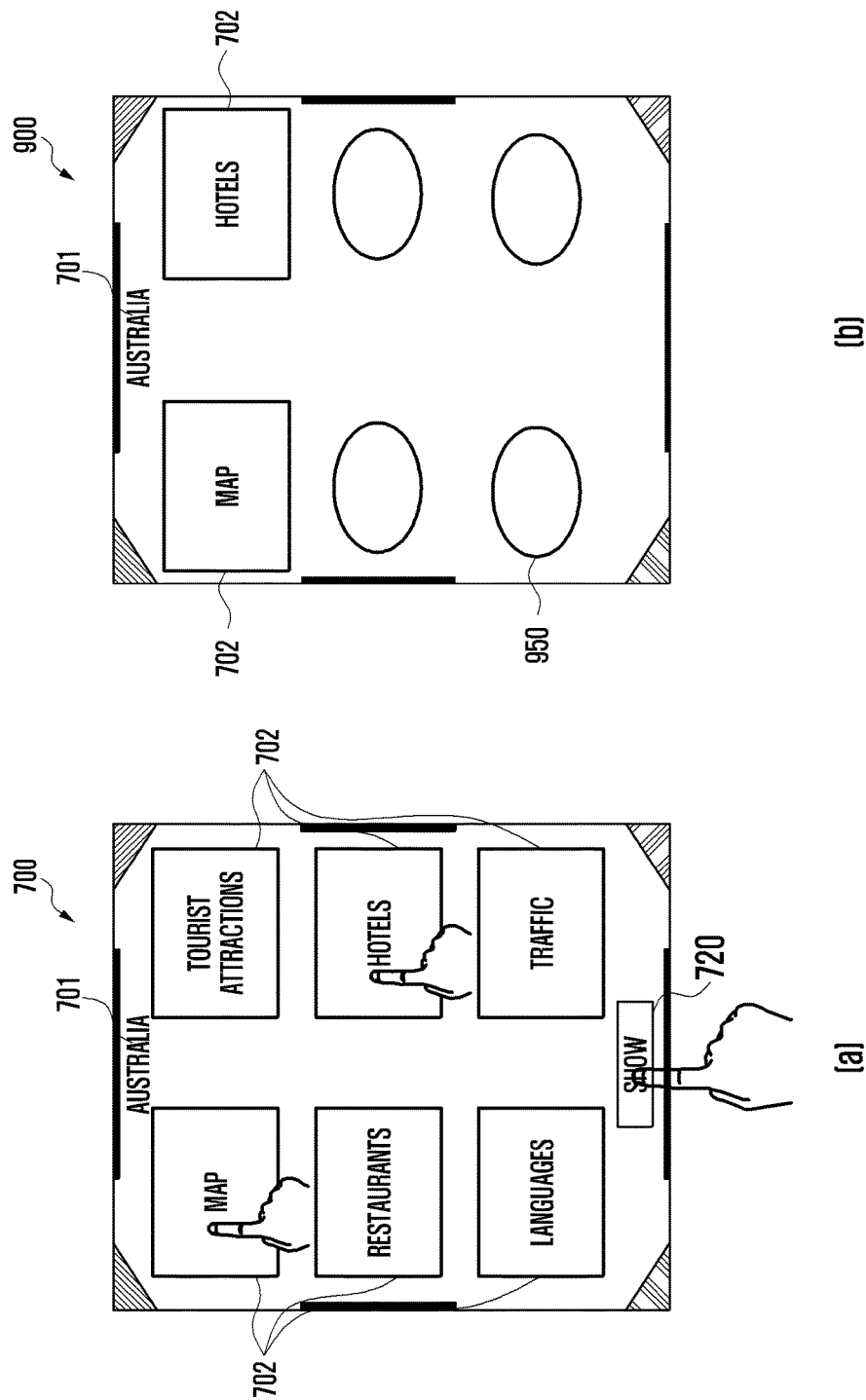
FIG. 9 illustrates an index page according to various embodiments of the present disclosure.

FIG. 9 illustrates an index page according to various embodiments of the present disclosure.

Referring to FIG. 9 (a), the processor 310 may recognize or detect a user's selection of categories 702 (e.g., "Map" and "Hotels"), and then a selection of the "show" button 720. Referring to FIG. 9 (b), the page processing module 313 may control the display module 341 to display data 950 stored for the selected categories 702. The page processing module 313 may display the selected categories 702 with at least one of a thumbnail, a representative text, or a representative image, and may display the data 950, which is extracted and stored for the categories 702, together with the categories 702. In addition, the page processing module 313 may change a structure (or layout, format, design, etc.) of displaying the data 950 stored according to the user's selection.

Figure 10:
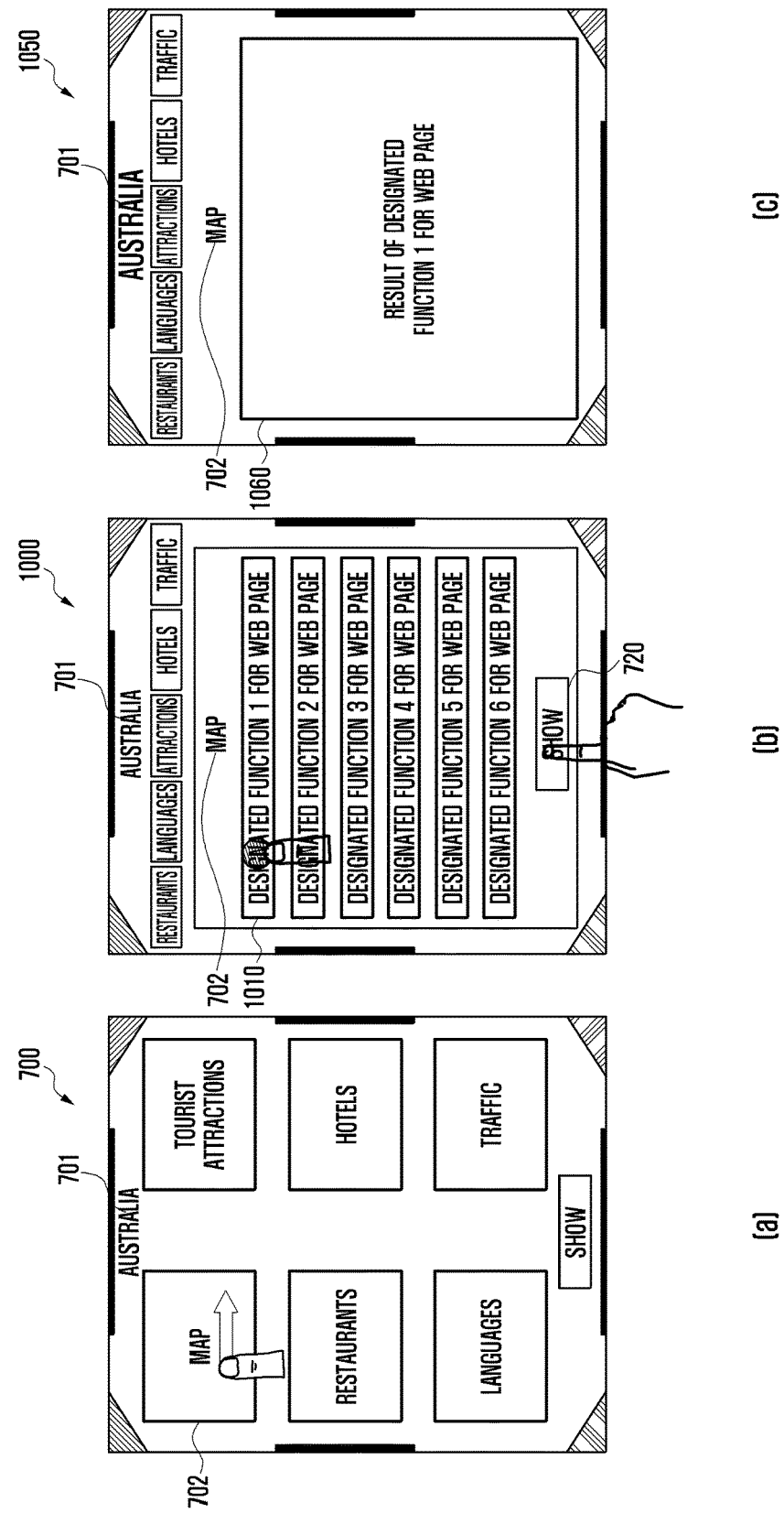
FIG. 10 illustrates an index page according to various embodiments of the present disclosure.

FIG. 10 illustrates an index page according to various embodiments of the present disclosure.

Referring to FIG. 10 (a), the processor 310 may recognize a user's particular gesture for selecting a category 702 (e.g., "Map"). Referring to FIG. 10 (b), the page processing module 313 may create a page 1000 based on the particular gesture detected in FIG. 10 (a) (e.g., a slide or swipe to the right in this example). The particular gesture may be set so that when it is detected, the page 1000 is displayed which can provide a variety of designated functions. The page processing module 313 may allow the user to change a gesture input method and a function for the particular gesture. Referring to FIG. 10 (b), the page processing module 313 may recognize the user's selection of a "show" button 720 and function 1 as displayed in a function list 1010 designated for the category 702 (e.g., "Map"). Referring to FIG. 10 (c), the page processing module 313 may include a page 1050, displaying a result 1060 of the function 1 for the category 702 (Map), which is displayed according to the user's selection as illustrated in FIG. 10 (b).

Figure 11:
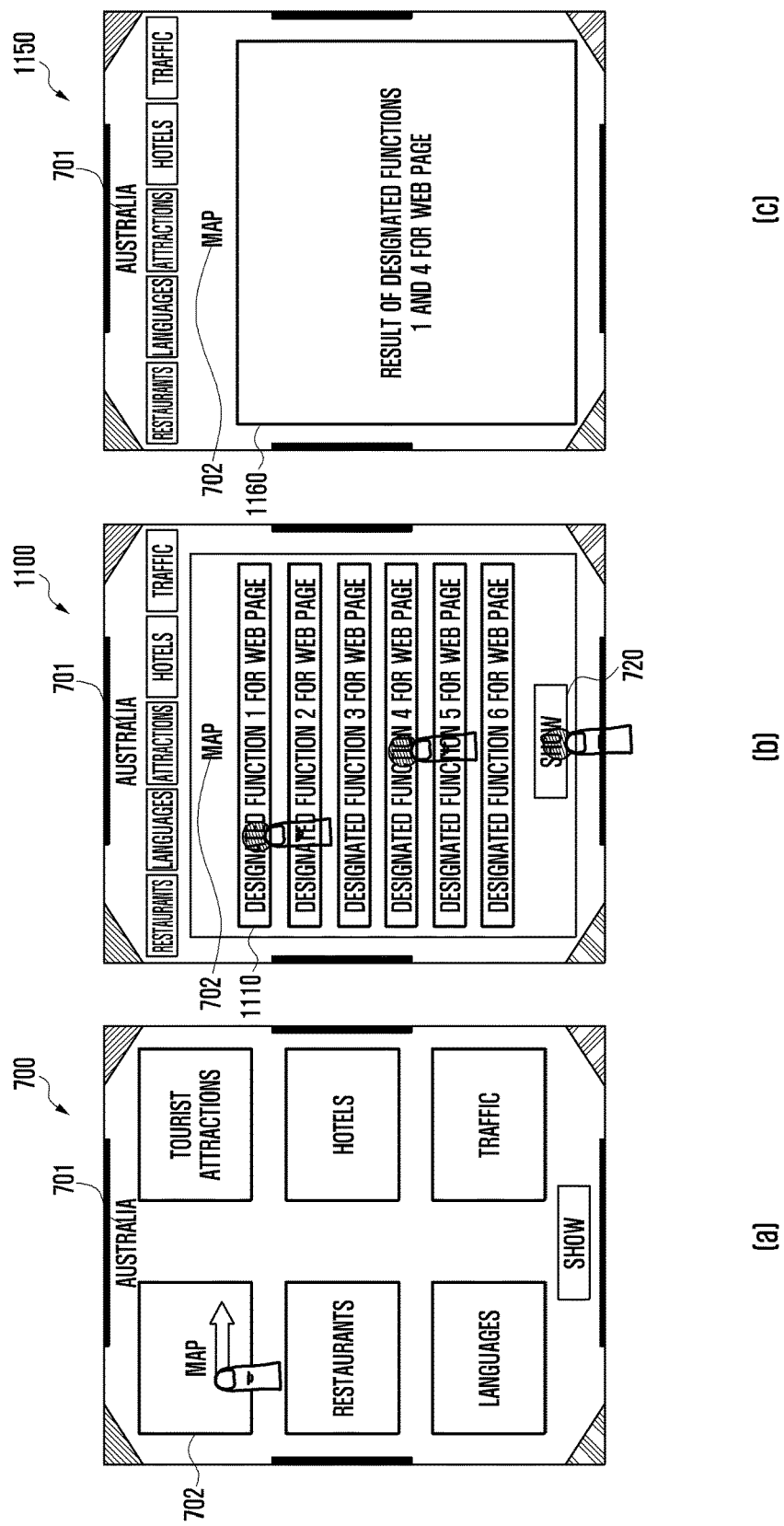
FIG. 11 illustrates an index page according to various embodiments of the present disclosure.

FIG. 11 illustrates an index page according to various embodiments of the present disclosure.

Referring to FIG. 11 (a), the processor 310 may recognize a user's particular gesture for selecting a category 702 (e.g., "Map"). Referring to FIG. 11 (b), the page processing module 313 may create a page 1100 represented by the particular gesture in FIG. 11 (a) (e.g., a slide or swipe to the right in this example). The particular gesture may be set such that when it is detected, the page 1100 is displayed which can provide a variety of designated functions. The page processing module 313 may allow the user to change a gesture input method and a function for the particular gesture. Referring to FIG. 11 (b), the page processing module 313 may recognize the user's selection of a show button 720 and both functions 1 and 4 in a function list 1110 designated for the category 702 (Map). Referring to FIG. 11 (c), the page processing module 313 may include a page 1150 such that a result 1160 of both the functions 1 and 4 for the category 702 (Map) is displayed by the user's selection illustrated in FIG. 11 (b).

Figure 12:
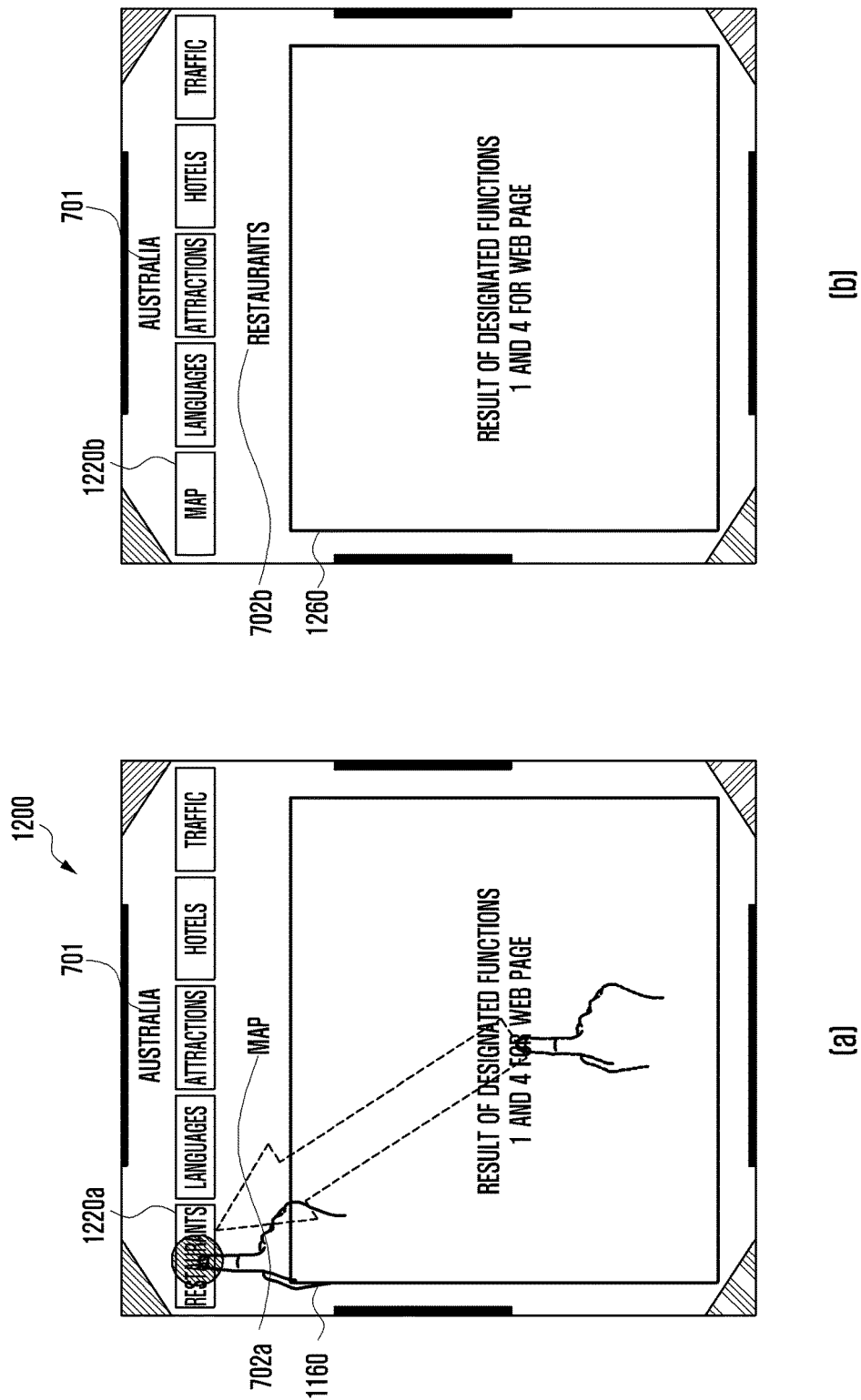
FIG. 12 illustrates an index page according to various embodiments of the present disclosure.

FIG. 12 illustrates an index page according to various embodiments of the present disclosure.

Referring to FIG. 12 (a), the page processing module 313 may include another page 1200 such that a result 1160 of functions 1 and 4 for a category 702a (e.g., "Map") is displayed by a user's selection. The page processing module 313 may recognize the user's gesture which will be described below. The user may "drag and drop" the result 1160 into a displayed category 1220a (e.g., "Restaurants") disposed on (in this example) an upper side of the page 1200. The gesture may be changed according to the user's selection which the page processing module 313 receives. The page processing module 313 may include the page 1200 illustrated in FIG. 12 (b) by recognizing the user's gesture. The page processing module 313 may change a displayed category 702b from 'Map' to 'Restaurants' according to recognition of the user's gesture, as illustrated in FIG. 12 (a). In addition, the page processing module 313 may also change a category list 1220b disposed upon, in this example, the upper side of the page 1200. The page processing module 313 may further detect or receive the user's gesture and replace the result 1160 corresponding to the designated functions for the category 702a with a result 1260 corresponding to the designated functions for the category 702b, and display a page representing the result 1260.

Figure 13:
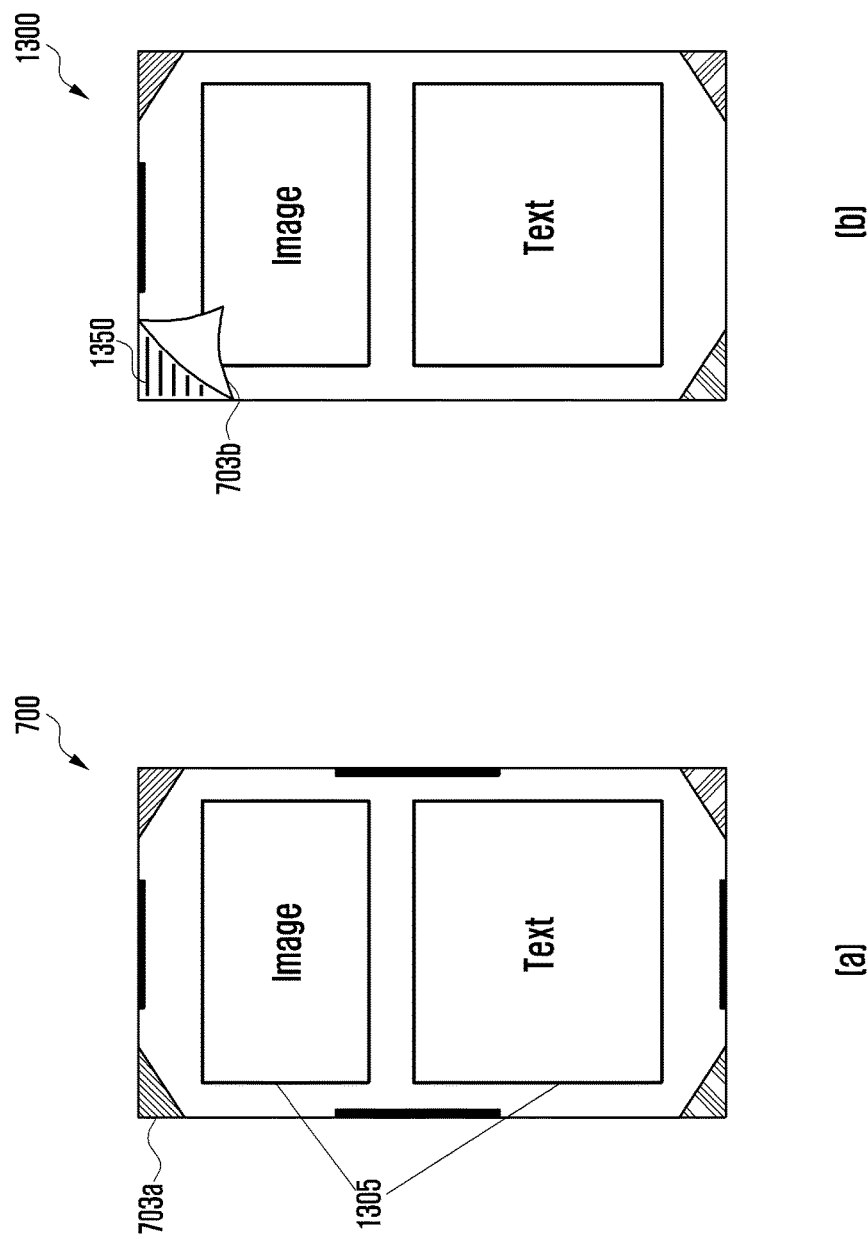
FIG. 13 illustrates an index page according to various embodiments of the present disclosure.

FIG. 13 illustrates a displayed page according to various embodiments of the present disclosure.

Referring to FIG. 13(a), the page processing module 313 may control the display module 341 to display a page 700 which includes details 1305 of a category, and eight marks, including mark 703a, for performing preset functions.

Referring to FIG. 13 (b), the page processing module 313 may perform a particular gesture (e.g., a drag, a press, and a long press) according to a user's selection of a mark 703a to display an additional explanation 1350 for the function of a mark 703b. For example, the page processing module 313 may recognize the user's particular gesture on at least one of the eight marks and in response, display the changed mark 703b. In addition, the page processing module 313 may display a page 1300 which includes display of the additional explanation 1350 for the function of the mark 703b at the location of the mark 703a (e.g., in the location where the mark 703a was disposed before the change). The eight marks 703 to 710 may perform different functions, and particular gestures for performing the respective functions may be changed according to the user's setting.

Figure 14A:
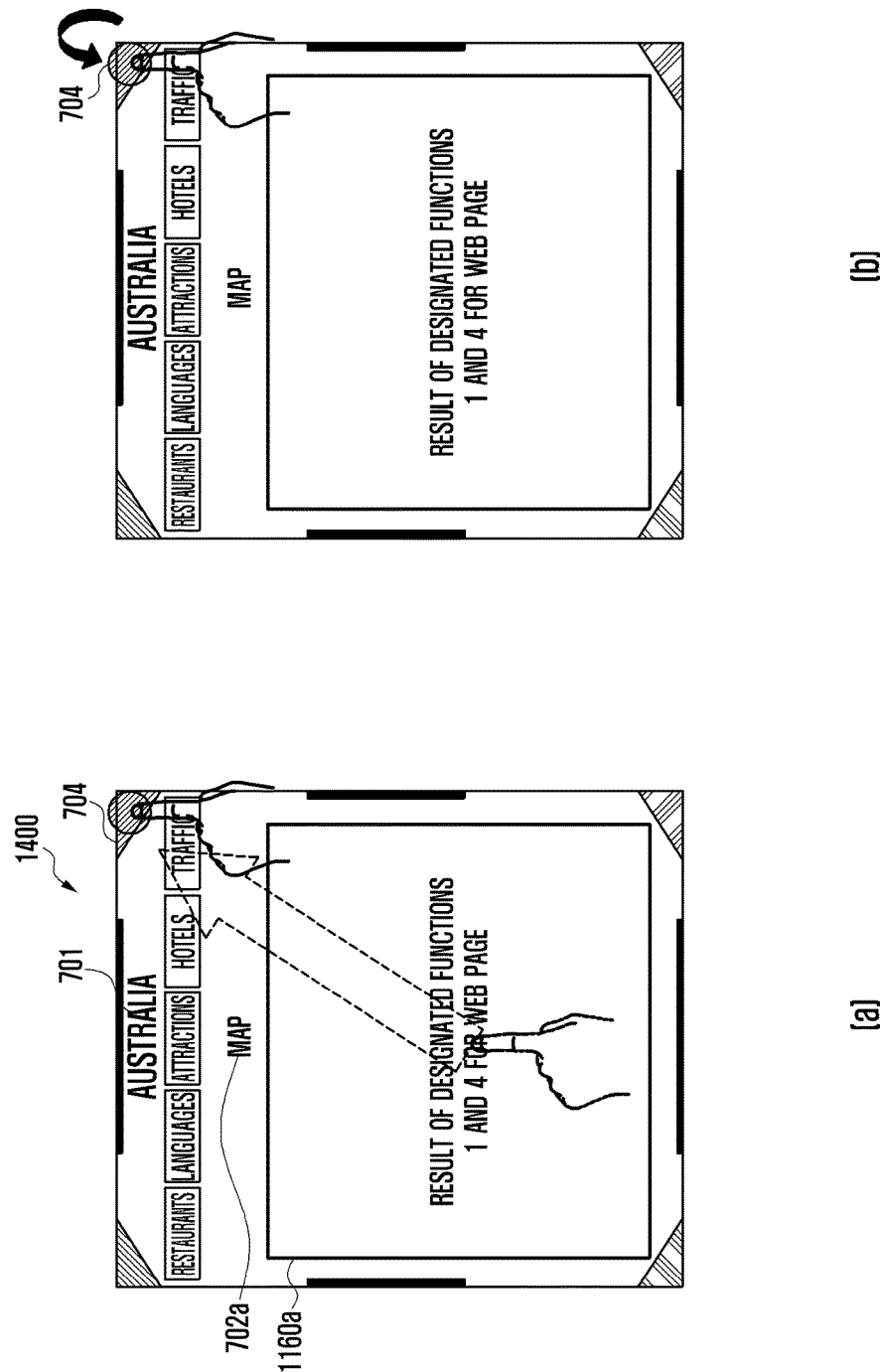
FIG. 14A and FIG. 14B illustrate an index page according to various embodiments of the present disclosure.
Figure 14B:
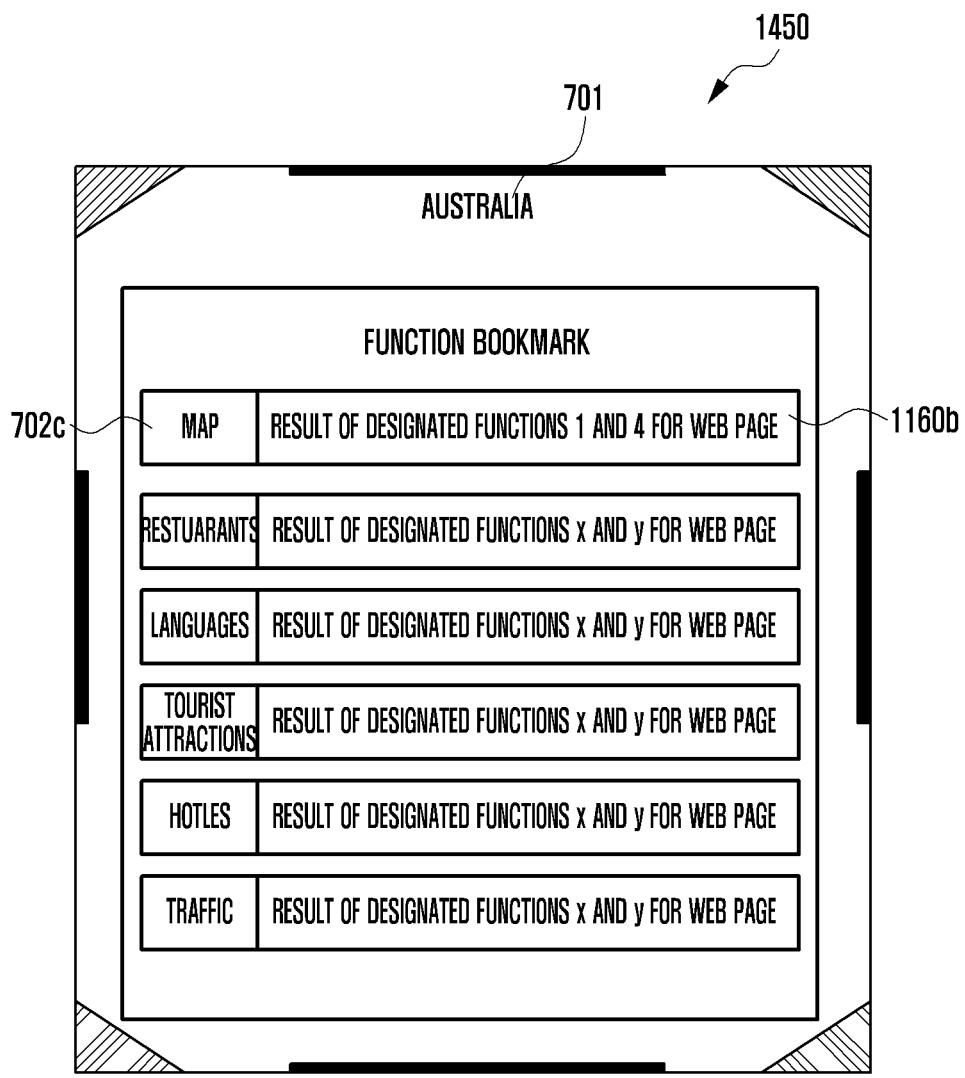

FIGS. 14A and 14B illustrate a displayed page according to various embodiments of the present disclosure.

Referring to FIG. 14A (a), the page processing module 313 may control the display module 341 to display a page 1400 including a result 1160a generated by execution of a designated function for a category 702a (e.g., "Map"), and eight marks for performing preset functions, including a mark 704. The page processing module 313 may perform the functions of the eight marks according to a user's particular gesture for each of the eight marks. For example, in FIG. 14A (a), the page processing module 313 may set a bookmark function for the mark 704. Thus, activation of mark 704a may set a bookmark for page 1450. The page processing module 313 may recognize a user's "drag and drop" gesture moving from the result 1160a of the designated function to the mark 704, and store the result 1160a of the designated function in the bookmark page 1450. In FIG. 14A (b), the page processing module 313 may recognize the user's selection of the mark 704. In FIG. 14B (c), the page processing module 313 may recognize the operation performed, as illustrated in FIG. 14A (a), to display results 1160b of the designated functions stored in the bookmark page 1450 for respective categories 702c.

Figure 15:
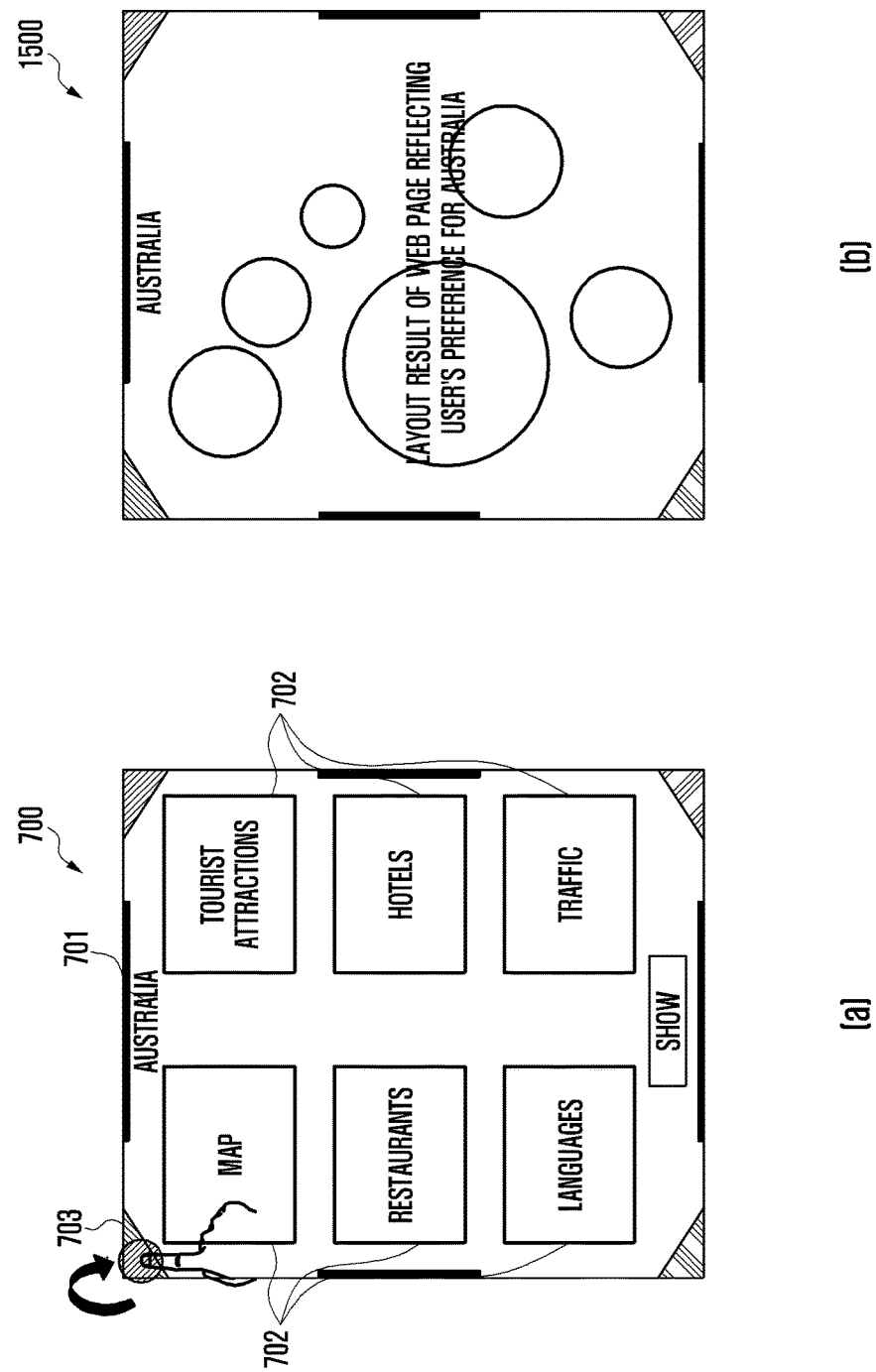
FIG. 15 illustrates an index page according to various embodiments of the present disclosure.

FIG. 15 illustrates a page according to various embodiments of the present disclosure.

Referring to FIG. 15 (a), the page processing module 313 may control the display module 341 to display a page 700 including categories 702 and eight marks, including mark 703, for performing preset functions. The page processing module 313 may perform the functions of the eight marks according to a user's particular gesture for each of the marks. FIG. 15 (a), the page processing module 313 may set a function of displaying a web page 1500, which reflects a user's preference, for a particular mark 703. The page processing module 313 may recognize or detect the user's selection of the mark 703 to display the web page 1500 corresponding to the user's preference for the subject 701 (e.g., "Australia") using a particular template, as illustrated in FIG. 15 (b). The page processing module 313 may recognize the user's selection to change the template.

Figure 16:
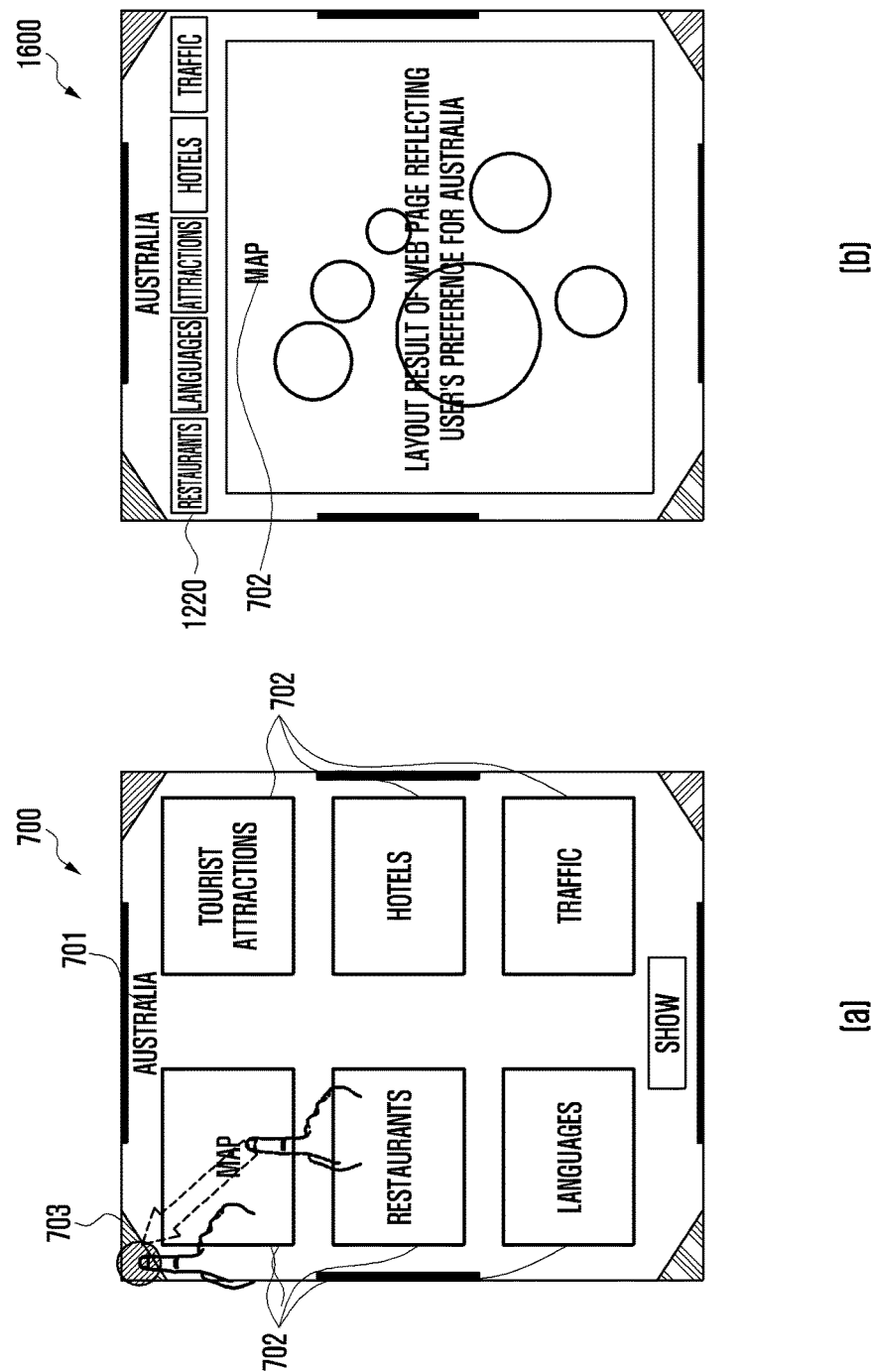
FIG. 16 illustrates an index page according to various embodiments of the present disclosure.

FIG. 16 illustrates a page according to various embodiments of the present disclosure.

Referring to FIG. 16 (a), the page processing module 313 may control the display module 341 to display a page 700 including categories 702 and eight marks, including mark 703, for performing preset functions. The page processing module 313 may recognize a user's particular gesture from the category 702 (e.g., "Map") to the mark 703 in FIG. 16 (a), following the state illustrated in FIG. 15 (a). The page processing module 313 may recognize the user's selection of the mark 703 and, in response, display a web page 1600 including a web page result reflecting the user's preference and/or selection of the subject 702 (e.g., "Map"), using a particular template as illustrated in FIG. 16 (b). The page processing module 313 may display other unselected categories 1220 in the resulting page 1600.

FIG. 17 illustrates a displayed page according to various embodiments of the present disclosure.

Figure 17B:
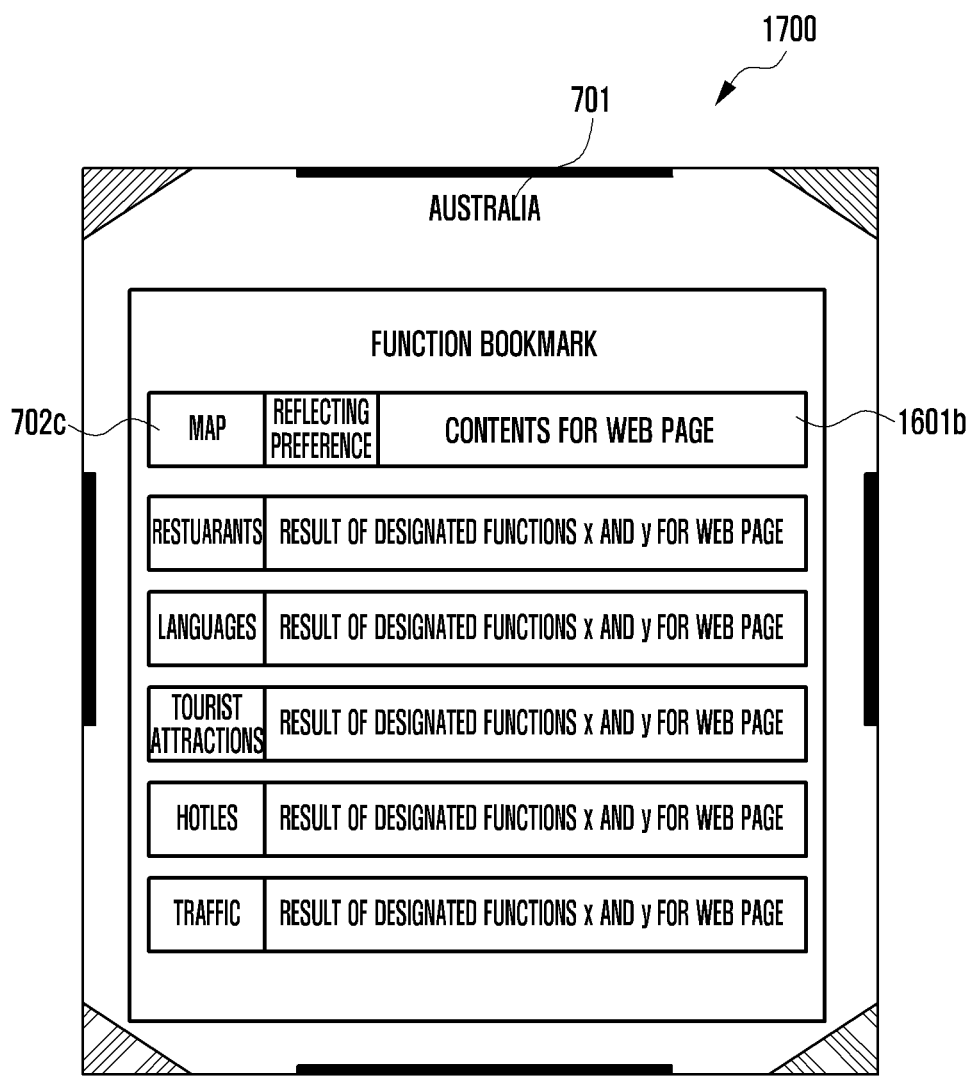

Referring to FIG. 17A (a), the page processing module 313 may control the display module 341 to display a page 700 including a number of categories including a particular category 702a, and eight marks, including a particular mark 703, the marks performing a number of preset functions. The page processing module 313 may recognize a user's particular gesture from the category 702a (e.g., "Map") to the mark 703 in FIG. 17A (a), following the state shown in FIG. 16 (a). The page processing module 313 may recognize the user's selection of the mark 703, and, in response, display a web page 1600 that includes a web page result 1061a reflecting the user's preference for the subject 702b (e.g., "Map"), using a particular template as illustrated in FIG. 17A (b). The page processing module 313 may display other unselected categories in a result page 1601a. The page processing module 313 may recognize the user's selection, which will be described below. The user may select at least one from the web page result 1601a to "drag and drop" it to a mark 704. The user's selection may include various gestures in addition to the "drag and drop." Referring to FIG. 17A (c), the page processing module 313 may recognize the user's selection of the mark 704. Referring to FIG. 17B, according to the user's selection, the page processing module 313 may control the display module 341 to display a bookmark page 1700 that is a designated function of the mark 704. The bookmark page 1700 may include a category 702c (e.g., "Map"), the web page result 1601a (e.g., reflecting the user's preference), and contents 1601b of the web page.

Figure 18:
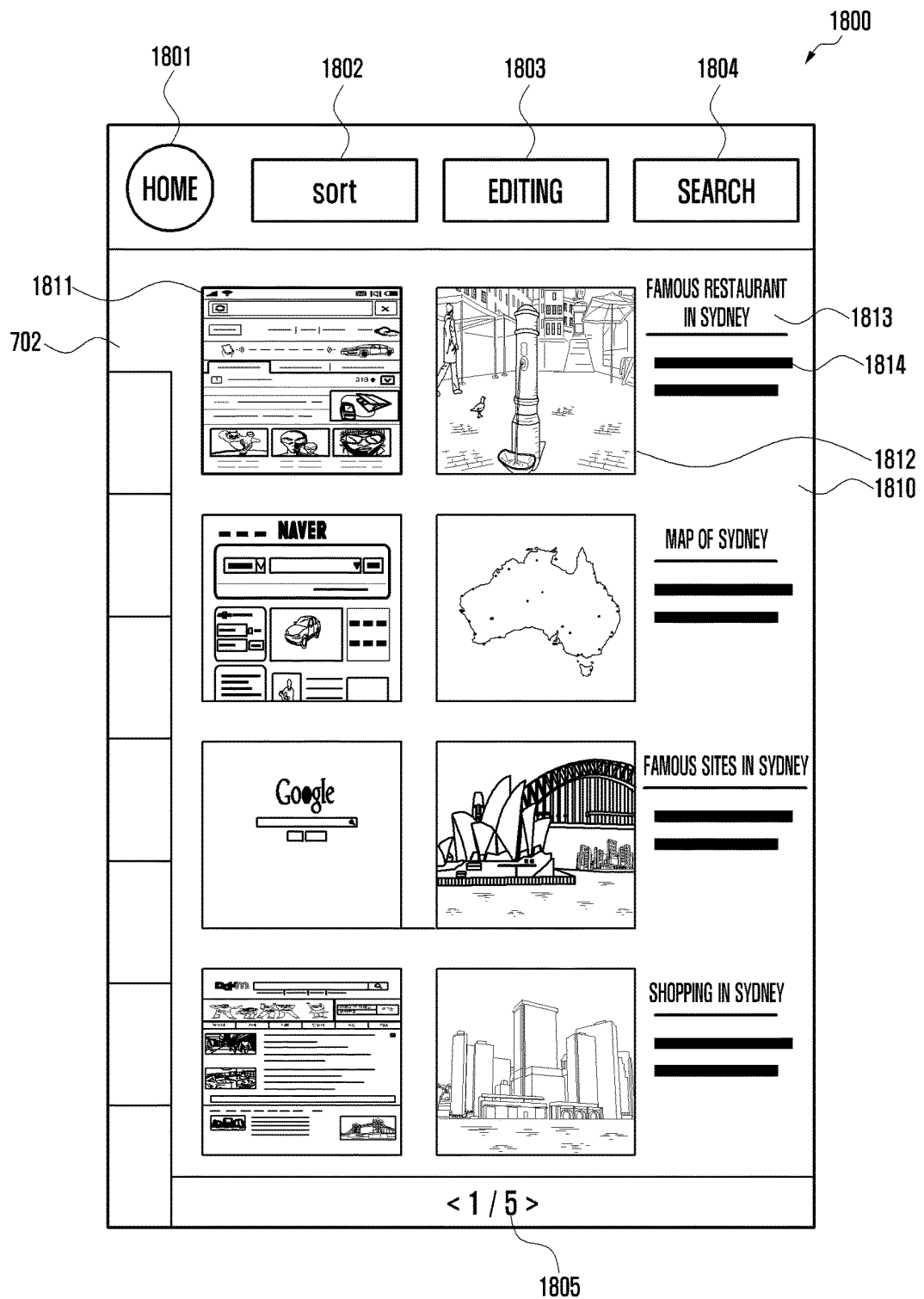
FIG. 18 illustrates an index page according to various embodiments of the present disclosure.

FIG. 18 illustrates an index page according to various embodiments of the present disclosure.

Referring to FIG. 18, the page processing module 313 may display at least one index page. The index page created by the page processing module 313 may include categories 702, a home button 1801, a sort button 1802, an editing button 1803, a search button 1804, a page shift button 1805, and page content 1810. The page content 1810 may include a screen shot 1811 of the stored web page, a thumbnail 1812 extracted from the web page, a representative text 1813 for explaining the thumbnail, and a summary 1814 related to the thumbnail.

Figure 19:
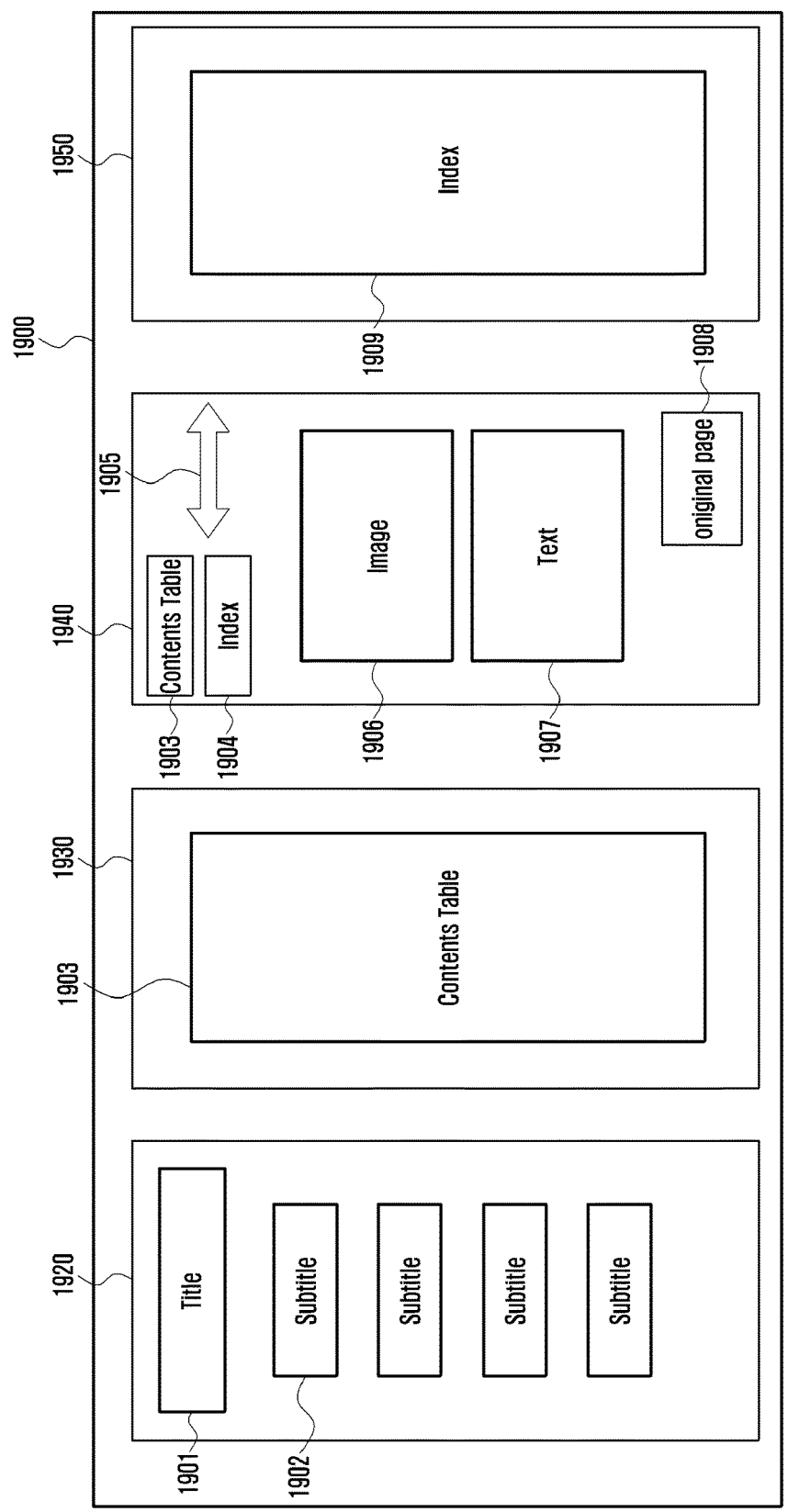
FIG. 19 illustrates a page according to various embodiments of the present disclosure.

FIG. 19 illustrates a page according to various embodiments of the present disclosure.

Referring to FIG. 19, the page processing module 313 may display a "group" page 1900 including at least one or more pages (e.g., windows, panes, pages, boards, etc.). Referring to FIG. 19, the group page (e.g., a screen including a group of pages) may include, for example, a title page 1920. The page processing module 313 may cause the title page 1920 to include a title 1901 and sub-titles 1902 in the title page 1920. The page processing module 313 may display a contents table page 1930 including a table of contents 190 for the particular displayed title 1901. The page processing module 313 may further display a contents page 1940 that may display contents for an item selected from the content table 1903 of the contents page 1930. The contents page 1940 may include a contents table button 1903 for returning to a contents table, an index button 1904 for returning to the first page, and a progress button 1905 for proceeding to a previous page or a next page. In addition, the contents page 1940 may include images 1906 of content for the selected contents table 1903, and text (e.g., textual details) 1907, and an "original page" importing button 1908 for displaying an original page from which contents were extracted. The group page may include an index page 1950 for displaying an index 1909. The page processing module 313 may display the index page 1950 as accessible to various titles by a user.

A method of storing and expressing a web page in an electronic device according to various embodiments of the present disclosure may include: extracting necessary data from a web page based on a parameter; storing the extracted data; sorting items based on the stored data; making a configuration to perform a function designated based on the items and the stored data; creating a page for which the function is configured; and displaying a page group including the page.

According to various embodiments of the present disclosure, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various example embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the disclosure. Under the broadest reasonable interpretation, the appended claims are statutory subject matter in compliance with 35 U.S.C. § 101.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the disclosure.

What is claimed is:

1. A method in an electronic device comprising a processor, a display, and a memory, comprising:
    searching web pages based on at least one parameter;
    determining whether to store at least one web page of the searched web pages according to at least one of a current time, a network condition, a location, an additional charge condition, and a battery condition;
    in response to determining to store the at least one web page, storing the at least one web page without user input;
    extracting data from the stored web page;
    sorting the extracted data into a plurality of categories;
    creating an index page based on the plurality of categories for accessing to the extracted data by a user; and
    displaying the index page through the display among a group of index pages,
    wherein the at least one parameter, by the processor, is set based on the user's profile,
    wherein the index page includes at least one category of the plurality of categories, at least some of the extracted data, at least one function generated according to the at least some of the extracted data, the at least one function executable on the at least some of the extracted data, and
    wherein the creating of the index page is based on at least one of structure, layout, format, and design of the index page selected by the user.

2. The method of claim 1, wherein the extracting the data from the stored web page further comprises extracting the data in a list format from the stored web page.

3. The method of claim 1, wherein the data extracted from the stored web page further comprises keywords extracted from the stored web page.

4. The method of claim 1, wherein the data extracted from the stored web page is extracted in an abbreviated format from the stored web page.

5. The method of claim 1, wherein determining whether to store the at least one web page of the searched web pages comprises: in response to detecting that the electronic device is to have degraded network connectivity, determining to store the at least one web page.

6. The method of claim 1, wherein extracting the data from the stored web page further comprises:
    if the stored web page comprises a secondary web page linked with the stored web page, extracting additional data from the secondary web page.

7. The method of claim 1, wherein the plurality of categories and the extracted data from the stored web page are displayed in a thumbnail format.

8. The method of claim 1, wherein the index page comprises marks selectable to execute the at least one function.

9. The method of claim 1, wherein page types are displayed on the index page.

10. An electronic device, comprising:
    a display;
    a memory; and
    a processor configured to:
        search web pages based on at least one parameter,
        determine whether to store at least one web page of the searched web pages according to at least one of a current time, a network condition, a location, an additional charge condition, and a battery condition,
        in response to determining to store the at least one web page, store the at least one web page without user input,
        extract data from the stored web page,
        sort the extracted data into a plurality of categories,
        create an index page based on the plurality of categories for accessing to the extracted data by a user, and
        control the display to display the index page among a group of index pages,
        wherein the index page includes at least one category of the plurality of categories, at least some of the extracted data, at least one function generated according to the at least some of the extracted data, the at least one function executable on the at least some of the extracted data, and
    wherein the processor is further configured to:
        set the at least one parameter based on the user's profile, and
        select at least one of structure, layout, format, and design of the index page based on user input.

11. The device of claim 10, wherein the processor is further configured to extract the data in a list format from the stored web page.

12. The device of claim 10, wherein the data extracted from the stored web page further comprises keywords extracted from the stored web page.

13. The device of claim 10, wherein the data extracted from the stored web page is extracted in an abbreviated format from the stored web page.

14. The device of claim 10, wherein the processor is configured to determine, in response to detecting that the electronic device is to have degraded network connectivity, to store the at least one web page in the memory.

15. The device of claim 10, wherein the processor is configured to extract, if the stored webpage comprises a secondary web page linked with the stored webpage, additional data from the secondary web page.

16. The device of claim 10, wherein the plurality of categories and the extracted data from the stored web page are displayed in a thumbnail format.

17. The device of claim 10, wherein the index page comprises marks selectable to execute the at least one function.

18. The device of claim 10, wherein page types are displayed on the index page.

* * * * *